(12) United States Patent
Gonzalez-Banos et al.

(10) Patent No.: US 10,720,182 B2
(45) Date of Patent: Jul. 21, 2020

(54) DECOMPOSITION OF A VIDEO STREAM INTO SALIENT FRAGMENTS

(71) Applicants: Hector H. Gonzalez-Banos, Mountain View, CA (US); Ramya Narasimha, Palo Alto, CA (US)

(72) Inventors: Hector H. Gonzalez-Banos, Mountain View, CA (US); Ramya Narasimha, Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/447,416

(22) Filed: Mar. 2, 2017

(65) Prior Publication Data

US 2018/0254064 A1  Sep. 6, 2018

(51) Int. Cl.

| | |
|---|---|
| *G11B 27/031* | (2006.01) |
| *G06F 16/738* | (2019.01) |
| *G06F 16/783* | (2019.01) |
| *G06F 16/78* | (2019.01) |
| *G06F 16/732* | (2019.01) |
| *G06K 9/00* | (2006.01) |

(52) U.S. Cl.
CPC ......... *G11B 27/031* (2013.01); *G06F 16/739* (2019.01); *G06F 16/7328* (2019.01); *G06F 16/783* (2019.01); *G06F 16/785* (2019.01); *G06F 16/786* (2019.01); *G06F 16/7867* (2019.01); *G06K 9/00751* (2013.01); *G06K 9/00771* (2013.01)

(58) Field of Classification Search
CPC ... G11B 27/031; G06F 16/783; G06F 16/739; G06F 16/786; G06F 16/785; G06F 16/7867; G06F 16/7328; G06K 9/00751; G06K 9/00771
See application file for complete search history.

(56) References Cited

U.S. PATENT DOCUMENTS 6,496,856 B1   12/2002   Kenner et al.
8,311,277 B2   11/2012   Peleg et al.
(Continued)

FOREIGN PATENT DOCUMENTS

EP    0 932 298    7/1999
EP    3070938      9/2016
(Continued)

OTHER PUBLICATIONS

Briefcam, BriefCam White Paper, White Paper: Video Synopsis Technology, 2010, 2 pages.
(Continued)

*Primary Examiner* — Thai Q Tran
*Assistant Examiner* — Sunghyoun Park
(74) *Attorney, Agent, or Firm* — Patent Law Works LLP

(57) ABSTRACT

The disclosure includes a system and method for decomposing a video to salient fragments and synthesizing a video composition based on the salient fragments. A video decomposition application extracts non-salient portions of a video, extracts a plurality of salient fragments of the video, builds a database of the plurality of salient fragments, receives a query, retrieves, from the database of the plurality of salient fragments, a set of salient fragments based on the query, and synthesizes a video composition based on the set of salient fragments and the non-salient portions of the video.

20 Claims, 26 Drawing Sheets

(56) References Cited

U.S. PATENT DOCUMENTS

| | | | |
|---|---|---|---|
| 8,949,235 | B2 | 2/2015 | Peleg et al. |
| 10,204,264 | B1 | 2/2019 | Gallagher et al. |
| 2002/0071556 | A1 | 6/2002 | Moskowitz et al. |
| 2002/0071596 | A1 | 6/2002 | Estevez |
| 2002/0172394 | A1 | 11/2002 | Venkatesan et al. |
| 2002/0178368 | A1 | 11/2002 | Yin et al. |
| 2003/0058939 | A1* | 3/2003 | Lee .................. H04N 7/147 375/240.08 |
| 2003/0174773 | A1* | 9/2003 | Comaniciu ........... H04N 19/23 375/240.08 |
| 2003/0194131 | A1* | 10/2003 | Zhao .................... G06K 9/46 382/190 |
| 2004/0098376 | A1* | 5/2004 | Li ................. G06K 9/00711 |
| 2005/0240980 | A1 | 10/2005 | Jun et al. |
| 2006/0064411 | A1* | 3/2006 | Gross .............. G06F 17/30864 |
| 2007/0055695 | A1 | 3/2007 | Dorai et al. |
| 2007/0101147 | A1 | 5/2007 | Brunk et al. |
| 2007/0136656 | A1 | 6/2007 | Nydam et al. |
| 2008/0066136 | A1 | 3/2008 | Dorai et al. |
| 2008/0150431 | A1* | 6/2008 | Preston .............. H01J 61/0732 313/631 |
| 2008/0208828 | A1 | 8/2008 | Boiman et al. |
| 2010/0045799 | A1* | 2/2010 | Lei ................... G06K 9/00369 348/169 |
| 2010/0082575 | A1 | 4/2010 | Walker et al. |
| 2011/0052144 | A1 | 3/2011 | Abbas et al. |
| 2011/0285748 | A1* | 11/2011 | Slatter ................. G06T 11/60 345/629 |
| 2013/0036124 | A1 | 2/2013 | Ambwani et al. |
| 2013/0156277 | A1 | 6/2013 | Sasaki |
| 2013/0290249 | A1 | 10/2013 | Merriman et al. |
| 2014/0047558 | A1 | 2/2014 | Veerubhotla et al. |
| 2014/0188840 | A1 | 7/2014 | Agarwal et al. |
| 2014/0324864 | A1 | 10/2014 | Choe et al. |
| 2015/0254513 | A1* | 9/2015 | Mansour ............. G06F 16/783 382/190 |
| 2015/0269231 | A1* | 9/2015 | Huynh ............ G06F 17/30864 707/722 |
| 2016/0019239 | A1 | 1/2016 | Bastaldo-Tsampalis et al. |
| 2016/0071242 | A1* | 3/2016 | Uralsky .................. G06T 5/00 345/593 |
| 2016/0253576 | A1 | 9/2016 | Kilpatrick |
| 2016/0275356 | A1* | 9/2016 | Kuwahara ........ G08B 13/19669 |
| 2016/0323658 | A1* | 11/2016 | Richardson ........ H04N 21/8549 |
| 2017/0339238 | A1 | 11/2017 | Qin |
| 2018/0115788 | A1 | 4/2018 | Burns et al. |
| 2018/0376224 | A1 | 12/2018 | Chun et al. |

FOREIGN PATENT DOCUMENTS

| | | |
|---|---|---|
| JP | H10-84525 | 3/1998 |
| JP | H10-240774 | 9/1998 |
| JP | 2000056681 A | 2/2000 |
| JP | 2001024880 A | 1/2001 |
| JP | 2002-170104 | 6/2002 |
| JP | 2002-538642 | 11/2002 |
| JP | 2003-30204 | 1/2003 |
| JP | 2005-123824 | 5/2005 |
| JP | 2005346658 A | 12/2005 |
| JP | 2007-267294 | 10/2007 |
| JP | 2007-282268 | 10/2007 |
| JP | 2009-27564 | 2/2009 |
| JP | 2009-516257 | 4/2009 |
| JP | 2012199721 A | 10/2012 |
| JP | 2014-112280 | 6/2014 |
| JP | 2014-155190 | 8/2014 |
| JP | 2015-114685 | 6/2015 |

OTHER PUBLICATIONS

Pritch et al., Clustered Synopsis of Surveillance Video, 6th IEEE Int. Conf. on Advanced Video and Signal Based Surveillance, Sep. 2-4, 2009, 6 pages.

Bligh, Alex, "What is Distributed Storage and Why Use It," Flexiant, Jul. 26, 2013, retrieved on Jun. 14, 2018 from http://www.flexiant.com, 4 pages.

Apache, "Kafka 0.9.0 Documentation," documented on archive.org as of Nov. 20, 2015, https://web.archive.org/web/20151120080338/https://kafka.apache.org/090/documentation.html, 2015, 95 pgs.

Lin, "Watermarking and Digital Signature Techniques for Multimedia Authentication and Coypright Protection," internet citation, Jan. 1, 2000, retrieved from http://citeseerx.ist.psu.edu/viewdoc/summary?doi=10.1.1.32.5211, pp. 1-258.

Atrey et al., "A Hierarchical Signature Scheme for Robust Video Authentication Using Secret Sharing," Multimedia Modelling Conference, 2004, Proceedings, 10th International, IEEE, 8 pgs.

Author Unknown, "Apache Kafka is a Distributed Streaming Platform. What Exactly Does that Mean?" retrieved rom https://kafka.apache.org/intro on Jul. 13, 2017, 2 pgs.

Chang et al., "Robust Image Authentication Using Content Based Compression," Multimedia Systems 9, No. 2, 2003, pp. 121-130.

Dittmann et al., "Multimedia and Security," Workshop at ACM Multimedia '98, Bristol, UK, Sep. 12, 1998, 137 pgs.

Kreps, "The Log: What Every Software Engineer Should Know about Real-Time Data's Unifying Abstraction," retrieved from https://engineering.linkedin.com/distributed-systems/log-what-every-software-engineer-should-know-about-real-time-datas-unifying, Dec. 16, 2013, 29 pgs.

Lin et al., "Detection of Image Alterations Using Semi-Fragile Watermarks," Security and Watermarking of Multimedia Contents II. vol. 3971, International Society for Optics and Photonics, 2000, 12 pgs.

Lin et al., "Video and image watermark synchronization," Center for Education and Research in Information and Security, 2005, 238 pgs.

Manaf et al., "Review of Robust Video Watermarking Methods for Copyright Protection Application," International Journal of Video & Image Processing and Network Security, vol. 16, No. 3, Jun. 2016, 8 pgs.

Milano, "Content control: Digital watermarking and fingerprinting," White Paper, Rhozet, a business unit of Harmonic Inc., May 30, 2012, 11 pgs.

Office Action for JP Application No. 2018-032691, dated Feb. 19, 2019, 10 pgs. (with translation).

Office Action for JP Application No. 2018-036253, dated Feb. 26, 2019, 7 pgs. (with translation).

Rigoni et al., "Detecting tampering in audio-visual content using QIM watermarking," Information Sciences 328, 2016, pp. 127-143.

Schneider, "What's the Difference Between Message Centric and Data Centric Middleware?" dated Jul. 6, 2012, retrieved from http://electronicdesign.com/embedded/whats-difference-between-message-centric-and-data-centric-middleware, 5 pgs.

Wang et al., "A Video Watermarking Scheme Based on Motion Vectors and Mode Selection," Computer Science and Software Engineering, 2008 International Conference on, vol. 5, IEEE, 5pgs.

Yang et al., "Research of Digital Watermarking Algorithm Based on SVD and DWT," Applied Mechanics and Materials, vol. 65, Trans Tech Publications, 2011, 4 pgs.

Bastan et al., "BilVideo-7: an MPEG-7—compatible video indexing retrieval system," dated Jul. 2010, 11 pages.

Extended European Search Report for EP Application No. 18156914.6, dated Apr. 4, 2018, 9 pgs.

Extended European Search Report for EP Application No. 18156914.5, dated Apr. 4, 2018, 9 pgs.

Office Action for JP Application No. 2019-029024, dated Feb. 20, 2020, 10 pgs. (with translation).

\* cited by examiner

DECOMPOSITION OF A VIDEO STREAM INTO SALIENT FRAGMENTS

BACKGROUND

1. Field of the Invention

The specification generally relates to decomposition and synthesis of a video stream. In particular, the specification relates to a system and method for decomposing a video stream into salient fragments and synthesizing a video composition based on the salient fragments.

2. Description of the Background Art

In video surveillance and similar applications, a camera typically monitors scenes that for the most part are uneventful, i.e., the scene contains ordinary or unchanging elements, and only seldom does an event of interest manifest in the scene. As a result, video browsing and retrieval is time consuming, and most recorded surveillance videos are never watched or examined.

One attempt to address this problem is motion detection recording, which allows the camera to record only when motion is detected in the field of view of the camera, and thus reduces the total recording time. However, in scenes where people or objects are constantly moving, the total recording time using motion detection recording has almost no decrease. In addition, motion detection recording does not really relieve a viewer from the tedious and time-consuming task of browsing a video.

Another solution of the problem is to create a video synopsis or a video summarization for the video based on tracking and analyzing events of the video (e.g., moving objects), and including maximum activity in a short video clip of the long video. This approach might shorten the video for the purpose of saving browsing and retrieving time. However, this video synopsis or the video summarization is only responsive to a predetermined type of user query (e.g., "first 20 minutes," "last hour"), and thus has limited use.

SUMMARY

The techniques introduced herein overcome the deficiencies and limitations of the prior art, at least in part, with a system and method for decomposing a video stream into salient fragments and synthesizing a video composition based on the salient fragments. In one embodiment, the system includes a video decomposition application. The video decomposition application is configured to extract non-salient portions of a video. The video decomposition application is further configured to extract a plurality of salient fragments of the video. The video decomposition application is further configured to build a database of the plurality of salient fragments. In one embodiment, the video decomposition application is further configured to receive a query related to a first salient fragment of the plurality of salient fragments. In another embodiment, the query is a time interval. In yet another embodiment, the query is a direction of motion. The video decomposition application is further configured to retrieve, from the database of the plurality of salient fragments, a set of salient fragments based on the query. The video decomposition application is further configured to synthesize a video composition based on the set of salient fragments and the non-salient portions of the video.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
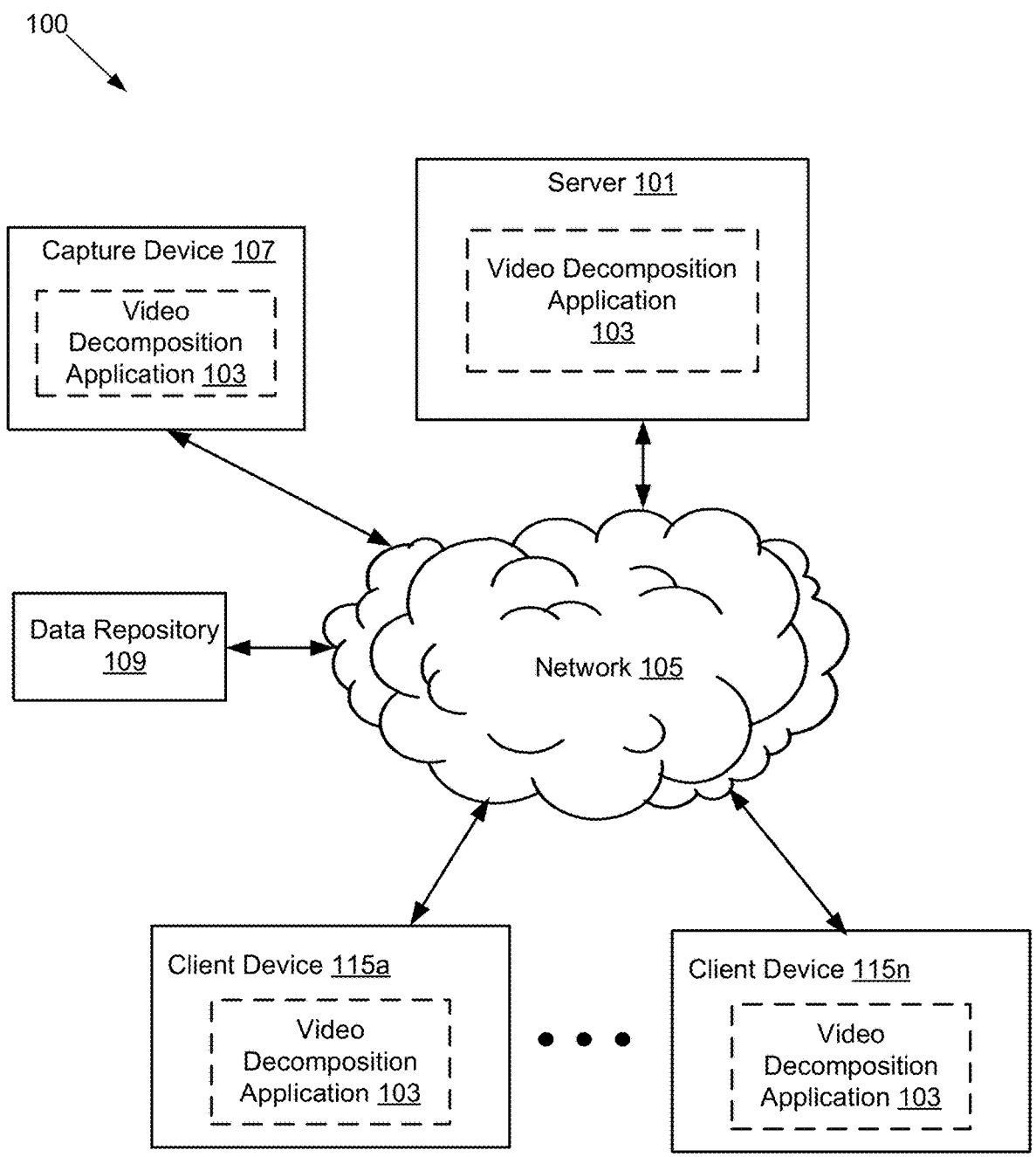
FIG. 1 depicts a high-level block diagram illustrating one embodiment of a system for decomposing a video stream into salient fragments and synthesizing a video composition based on the salient fragments.

FIG. 1 depicts a high-level block diagram illustrating one embodiment of a system 100 for decomposing a video stream into salient fragments and synthesizing a video composition based on the salient fragments. The illustrated system 100 includes a server 101, a capture device 107, a data repository 109, and client devices 115a, . . . , 115n. In the illustrated embodiment, the entities of the system 100 are communicatively coupled via a network 105. Although only a single server 101, a single capture device 109, a single data repository 109, and a single network 105 are shown in FIG. 1, it should be understood that there may be any number of servers 101 or a server cluster, any number of capture devices 107, any number of data repositories 109, and one or more networks 105 that connect these entities.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

The capture device 107 is a hardware device that captures video and associates metadata with the video. For example, the capture device 107 can be a camera, a camcorder, a video recorder, etc. The video captured by the capture device 107 can be any series of time-related images. In some embodiments, the capture device 107 captures images that are eventful, for example, the images may be of an object that is moving within a time period and forms a video of the moving object. In other embodiments, the capture device 107 captures images from a scene and combines the time-sequenced images to a video. The video may include images that are mostly uneventful, for example, a surveillance video that includes a large portion of images of unchanging elements in a scene and a small portion of images of interesting event manifesting in the scene.

The capture device 107 also associates metadata with the video, for example, a time and a location at which the video was captured, an image size, an image resolution, color depth, a shutter speed, etc. The metadata can be used in decomposing the video into salient fragments as described below, especially, when it is hard to use other approaches. For example, the metadata is particularly useful when a motion detection approach fails in decomposing a video to salient fragments. The video may be taken in a crowded place and include a large number of moving objects. In some embodiments, the capture device 107 stores the video and associated metadata in a data storage equipped with the capture device 107. In other embodiments, the capture device 107 transmits the video and associated metadata to the data repository 109 for storage. In some other embodiments, the capture device 107 (e.g., a smart camera) further comprises a video decomposition application 103 for processing a video to generate a video composition as described below.

The data repository 109 is a facility designated for storing data. For example, the data repository 109 can be a data storage facility that stores videos received from the capture device 107, a database of a video sharing website, a cloud storage that stores videos received from the client device 115a, etc. In some embodiments, the data repository 109 provides videos upon a request for the videos from the client device 115 or the server 101.

The client device 115 is a computing device including a processor, a memory, applications, a database, and network communication capabilities. For example, the client device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the sever 101, the capture device 107, and the data repository 109. In some embodiments, the client device 115 includes a capture device (not shown), and thus possesses the capability of navigating throughout its environment and acquiring a series of time-related images of a video. For example, the client device 115 is a smart phone with a camera. In FIG. 1 and the remaining figures, a letter after a reference number, e.g., "115a," represents a reference to the element having that particular reference number. A reference number in the text without a following letter, e.g., "115," represents a general reference to instances of the element bearing that reference number.

The client device 115 receives and sends data to and from a user accessing the client device 115. For example, the client device 115 presents a video to a user and receives user input regarding a portion of the video from the user. The client device 115 also communicates with the server 101, the capture device 107, and the data repository 109 via the network 105 for providing functionality described herein. In some embodiments, the client device 115 further comprises a video decomposition application 103 for processing a video to generate a video composition as described below.

The server 101 may be either a hardware server, a software server, or a combination of software and hardware. The server 101 may be, or may be implemented by, a computing device including a processor, a memory, applications, a database, and network communication capabilities. In some embodiments, the server 101 receives a video, identifies salient fragments and non-salient portions of the video, and, responsive to a query of the video from a user, synthesizes a video composition for displaying to the user based on the salient fragments and the non-salient portions of the video. The video composition is a summarization of the video, which may be different from the video in that: 1) the video composition is responsive to a user query and emphasizes the information of the original video that corresponds to the salient fragments related to the query, and/or 2) the video composition is shorter than the original video in time length. Because the video composition includes richer content in a shorter time duration than the original video, user's time and network bandwidth for obtaining useful information from a video are reduced by using the video composition.

In some embodiments, the server 101 sends and receives data to and from other entities of the system 100 via the network 105. For example, the server 101 receives a video from the capture device 107 or the data repository 109, receives user input regarding the video from the client device 115, and sends a video composition to the client device 115.

In some embodiments, the server 101 includes a video decomposition application 103. The video decomposition application 103 may include software and/or logic to provide the functionality for decomposing a video into salient fragments and synthesizing a video composition based on the salient fragments. In some embodiments, the video decomposition application 103 can be implemented using programmable or specialized hardware. In some embodiments, the video decomposition application 103 can be implemented using a combination of hardware and software. In other embodiments, the video decomposition application 103 may be stored and executed on a combination of the server 101 and the client device 115. In FIG. 1, the video decomposition application 103 is depicted in dashed lines to indicate that it can reside on the server 101, the client device 115, the capture device 107, or a combination thereof.

In some embodiments, the video decomposition application 103 receives a video including a series of time-related images, and extracts non-salient portions and salient fragments of the video. The non-salient portions of the video may include objects that are static or slow-moving, for example, a quiet street or a neon beacon of a theater that is repetitively flashing in a surveillance video. The non-salient portions of the video may also include an object that is irrelevant to another object that is more eventful, more interesting, or more salient, for example, audiences being considered as the non-salient portions of a football video as compared to the football players on the field. In some embodiments, the video decomposition application 103 determines saliency of objects, extracts salient objects from the video based on the saliency, and generates a plurality of salient fragments based on the salient objects. The video decomposition application 103 may determine saliency based on motion detection, color, contrast, semantic information, etc. For example, the video decomposition application 103 determines that a first person is a salient object because he is moving left while other people in the video are moving right. The video decomposition application 103 links the related portions of the salient object to generate a salient fragment. For example, the video decomposition application 103 tracks each salient object over the time length of the video, and defines a track of a salient object as a salient fragment. A salient fragment includes multiple time-related frames of the video, where each frame of the salient fragment at a time instant includes a particular region that is slightly different and is connected in a certain continuity.

In some embodiments, responsive to determining a plurality of salient fragments, the video decomposition application 103 determines related fragments and generates a connectivity graph that connects the related fragments. The video decomposition application 103 may determine related fragments based on a spatio-temporal overlap. For example, if a salient object appears in two fragments, or objects in the two fragments touch and/or influence each other at some point of time and at some point of the video, the two fragments are related. The video decomposition application 103 may also determine related fragments based on causality information. For example, if a man causes an object to fall down upon entering a store and leaving the store, the analysis module 205 would determine that a salient fragment of the falling object is related to a salient fragment of the man. The video decomposition application 103 connects the related fragments in the graph based on the spatio-temporal overlap or the causality information. In some embodiments, the video decomposition application 103 may further determine related fragments and connect the fragments in the graph based on other properties such as the color, the shape, the contrast, the semantic information or some other relation defined by a user. In some embodiments, the video decomposition application 103 clusters the salient fragments based on the connectivity in the graph. Each cluster is a group of fragments that does not connect to fragments contained in any other cluster. The connectivity graph and the clusters are used in building and indexing a database of the salient fragments.

The video decomposition application 103 creates a database of the salient fragments. The video decomposition application 103 also indexes the database of salient fragments to improve the speed of data retrieval from the database. In various embodiments, the video decomposition application 103 indexes the database based on the related salient fragments, the connectivity graph, the clusters, etc.

The video decomposition application 103 may search the database of salient fragments upon receiving a query about the video from a user and generate a video composition as the query result for display to the user. The query may be a salient fragment selected by the user or a time interval input by the user. In some embodiments, responsive to the query, the video decomposition application 103 synthesizes the video composition based on the retrieved salient fragments of the video and the non-salient portions of the video. The video composition is a plausible video that originates from the original video but is different from the original video. The video composition emphasizes some information of the original video based on excluding or omitting other information of the original video. In some embodiments, the video composition is also shorter than the original video in time.

For example, the video decomposition application 103 may receive a query related to a salient fragment of a first person in a video. The scene in the original video includes the first person moving left and crossing over a second person and a third person, while a fourth person and a fifth person were moving at a distant position in the video. The video decomposition application 103 may generate the video composition to modify the scene to keep the first, second, and third persons, and remove the fourth and fifth persons, since they were unrelated to the query regarding the first person. In other words, the video composition includes salient fragments associated with the queried first person, and salient fragments associated with the second person and the third person that may interact with the queried first person. The video composition does not include salient fragments associated with the fourth person and the fifth person that are unrelated to salient fragments associated with the first person. Compared to the original video, the video composition includes increased amount of useful information related to the queried first person, and is therefore more efficient in use.

There are some challenges when generating the video composition, especially a synopsis video. The synopsis video is a video composition where multiple fragments taking place at different points of time in the original video interval are stacked together and displayed simultaneously, thereby reducing the length of the video. The video decomposition application 103 performs time-shift based optimization to minimize the overlaps between fragments and reduce the overall time length of the synopsis to meet the user requirement when creating the synopsis video. In some embodiments, the video decomposition application 103 clusters the fragments and generates the synopsis video based on time-shifting the clusters such that multiple clusters could occur simultaneously. The video decomposition application 103 also weights each fragment based on the level of movement of the salient object in the fragment, and assigns each fragment to a different stack order or layer based on the weight. For example, the video decomposition application 103 treats stationary objects similarly to that of background (e.g., gives them a lower weight), while layering other objects based on speed of movement of the objects, which reduces the system and network resources by skipping one or more frames of a fragment that has a low weight (e.g., based on subsampling the fragment with the low weight to reduce the frame rate). The video decomposition application 103 further identifies a permissible zone of activity of the video, and determines the spatially shifted locations for placing the fragments in the synopsis video to reduce the number of collisions caused by coincident and bidirectional traffic in the video. The operation of the video decomposition application 103 and the functions listed above are described below in more detail with reference to FIGS. 2A-15B.

The techniques described herein are advantageous in various aspects. First, the video decomposition system described herein creates a database to store salient fragments that are used to dynamically generate a video composition. The dynamic retrieval of salient fragments ensures the dynamic generation of a video composition, for example, different sets of salient fragments may be retrieved to generate different video compositions responsive to a single query. Also, the database is dynamically updated to reflect the changes of the salient fragments, the connectivity graph, clusters, and other information. Second, the video decomposition system described herein indexes the visual information stored in the database and thereby allows a fast data retrieval for generating a video composition. In particular, the indexing and transmission of salient fragments is based on small pieces of a salient fragment (e.g., a segment) rather than an entire fragment, which not only increases the data retrieval rate, but also reduces the transmission time and network bandwidth. Third, building and indexing a database of salient fragments in the video decomposition system described herein enables query-driven reconstruction of a video. Different types of queries can be used to trigger the generation of the video composition. In addition, the video decomposition system described herein applies advanced approaches to solve problems and to optimize the generation of a video composition, such as overcoming the limitation associated with stationary objects, minimizing the number of collisions, etc.

Figure 2A:
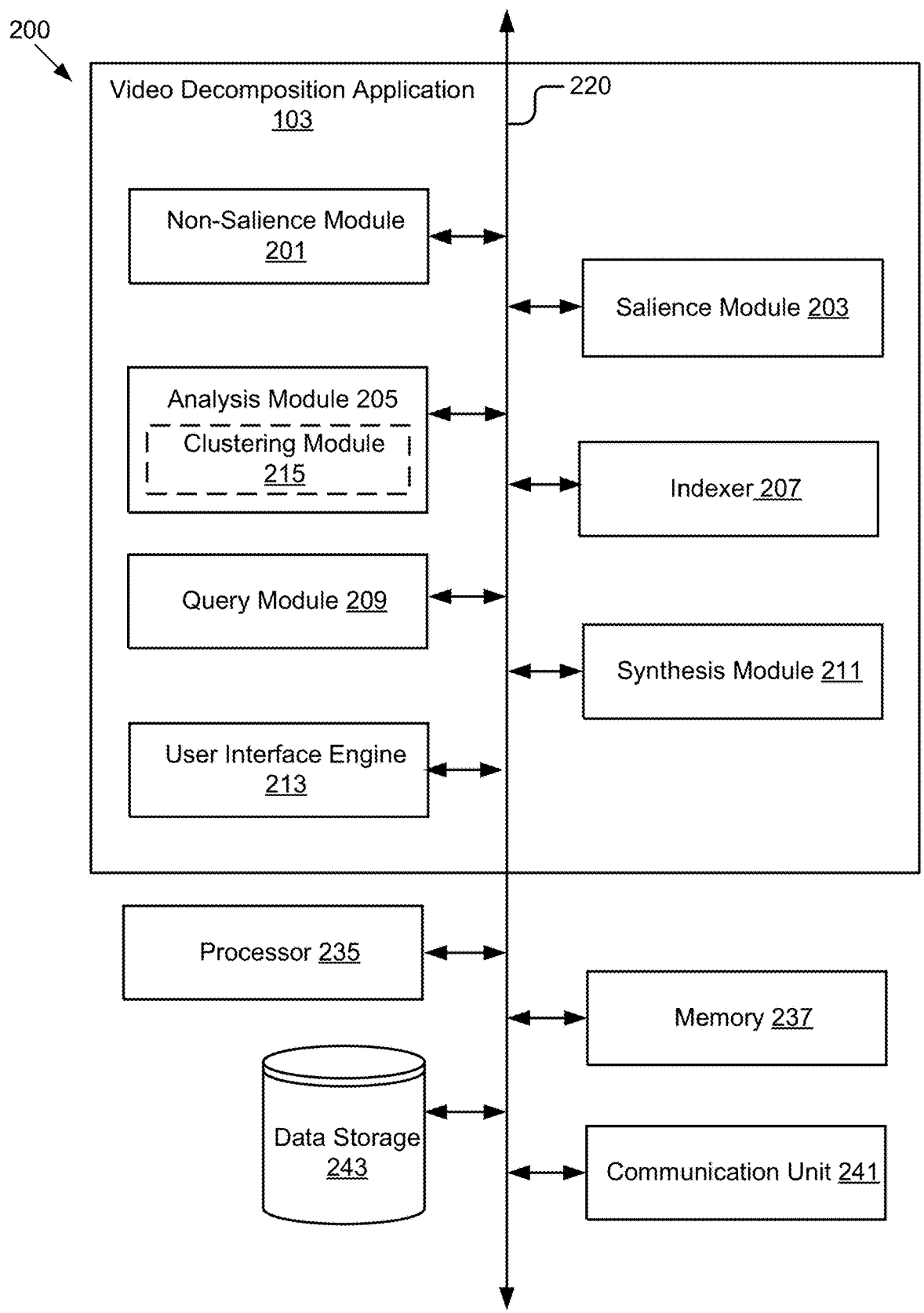
FIG. 2A depicts a block diagram illustrating one embodiment of a computing device including a video decomposition application.

FIG. 2A depicts a block diagram illustrating one embodiment of a computing device 200 including a video decomposition application 103. The computing device 200 may also include a processor 235, a memory 237, an optional display device 239, a communication unit 241, and data storage 243 according to some examples. The components of the computing device 200 are communicatively coupled to a bus or software communication mechanism 220 for communication with each other. In some embodiments, the computing device 200 is the server 101. In other embodiments, the computing device 200 is the client device 115. In some other embodiments, the computing device 200 is the capture device 107.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of user interfaces used in scheduling a consultation, and performing complex tasks including generating rules, identifying a recommended list of service providers, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the video decomposition application 103, and the data storage 243. It will be apparent to one skilled in the art that other processors, operating systems, and physical configurations are possible.

The memory 237 may store and provide access to data for the other components of the computing device 200. In some implementations, the memory 237 may store instructions and/or data that may be executed by the processor 235. The instructions and/or data may include code for performing the techniques described herein. For example, in one embodiment, the memory 237 may store the video decomposition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2A with dashed lines to indicate it is optional. For example, where the computing device 200 is a server 101, the computing device may not include a display device 239. However, where the computing device 200 is a client device 115, the computing device may include the display device 239 is used to display the user interfaces, videos, and or video compositions as described herein.

The communication unit 241 is hardware for receiving and transmitting data by linking the processor 235 to the network 105 and other processing systems. The communication unit 241 receives data such as video data from the capture device 107 or the data repository 109 for processing. The communication unit 241 may also transmit information to a client device 115 for display. For example, the communication unit 241 receives a selection of a portion of a salient fragment from a user of a client device, and transmits a video composition generated based on the selection of the salient fragment to the client device 115. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the client device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220. The data storage 243 stores information that is used to provide functionality as described herein. For example, the data storage 243 may store an original video, non-salient portions of the video, salient fragments of the video, clusters of the salient fragments, connectivity graphs of the salient fragments, weights associated with the salient fragments, time-shift information, spatial-shift information, permissible zones of activity, indexes of the salient fragments, a video composition, etc. The data stored in the data storage 243 is described below in more detail.

In some embodiments, the video decomposition application 103 includes a non-salience module 201, a salience module 203, an analysis module 205, an indexer 207, a query module 209, a synthesis module 211, and a user interface engine 213.

The components of the video decomposition application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The non-salience module 201 may include software and/ or logic to provide the functionality for extracting non-salient portions of a video. The video can be any series of time-related images received from the capture device 107, the data repository 109, or the client device 115. The non-salient portions of the video may include objects that are static, slow-moving or irrelevant to a task. In some embodiments, the non-salience module 201 extracts a fixed background of the video as the non-salient portions of the video. For example, the non-salient portions of a video may include a static and non-moving subway station in a video that is full of people and trains moving in the subway station. In other embodiments, the non-salient portions of the video include the slow-moving background of the video. The non-salience module 201 considers some motion (e.g., repetitively moving objects) in such background as foreseeable, and identifies such motion as non-salient portions of the video. For example, for a video recording traffic flow on a bridge, the non-salience module 201 may identify a running river under the bridge and trees on the edge of the river that are moving with wind as non-salient portions of the video. In some other embodiments, the non-salience module 201 determines non-salient portions of a video based on task dependent non-saliency. For example, the non-salience module 202 may determine that a first object is irrelevant to a task in the non-salient portions of the video, where the task is about a second object that is eventful, interesting to a user, and more salient than the first object. For example, the non-salience module 201 may separate audiences from football players that play on a field, and extract the portion of audiences as the non-salient portions of a video because the movement of audiences (e.g., talking, waving hands) is not eventful as compared to the football game. Or the non-salience module 201 may determine, from a surveillance video of a subway station, that people and other objects moving in the subway station are more interesting than the trains that come in and out of the subway station, and identify the portions of the trains as the non-salient portions of the video. In some embodiments, the non-salience module 201 builds a model and learns from the model to determine the non-salient portions of the video (e.g., slow-moving background). Examples of the models will be described below with reference to the salience module 203.

The salience module 203 may include software and/or logic to provide the functionality for extracting salient fragments of the video. A salient fragment of the video is a subset of frames of the video and a subset of pixels from the subset of frames. For example, pixels corresponding to an object in the video may be found in multiple frames of the video. These frames with the pixels corresponding to an object may be extracted from the video as a subset of frames. Further, the pixels corresponding to the object (and in some embodiments, some pixels surrounding the object) are extracted from each of the subset of frames. The resulting subset of frames including only the pixels associated with the object are a salient fragment.

Each frame of the salient fragment at a time instant includes a particular region that is slightly different and is connected in a certain continuity. For example, a salient fragment may include three time-related frames of an activity of waving hands. The first frame shows that a man is raising a hand to a first position. The second frame shows that the man is waving the hand at the first position. The third frame shows that the man is lowering the hand to a second position. A single salient fragment does not necessarily include a dramatic change of the particular region. That is, a fragment represents a sequence of small and/or steady changes in activity. Once the dramatic change occurs, for example, the region gets fractured, occluded, etc., a new salient fragment starts. For example, the salient fragment described above includes only three frames because the fourth frame that follows the third frame in the video does not contain the man's hand. In other words, a salient fragment is an atom of the original video that starts when a block of pixels appears in a scene and ends when the block of pixels disappears from the scene.

In some embodiments, the salience module 203 determines saliency of objects, extracts salient objects from the video based on the saliency, and generates a plurality of salient fragments based on the salient objects. The saliency represents a pronounced feature of the video, and the corresponding salient fragment is a highlight of the video with noticeable quality that shows the pronounced feature. For example, the salience module 203 extracts, from a surveillance video, a salient fragment including movements of a suspect, based on the most pronounced feature being a blacklisted individual (i.e., the salient object).

In some embodiments, the salience module 203 determines saliency of objects in a video based on at least one of motion detection, contrast, color, and semantic properties. A salient object therefore may be an object that is moving or an object that is of certain color or certain contrast. The salient object may also be an object with semantic significance. For example, for a conversation video, the salience module 203 may determine the person who did the most talking (e.g., answers other people's questions) as a salient object based on the semantic significance. Or, for example, the salience module 203 may determine a car with a certain label as an object with semantic significance.

In some embodiments, the salience module 203 uses a background and foreground separation method based on motion detection to identify a moving object as a salient object. The salience module 203 may extract a foreground of the video based on object movements, and identify an object in the foreground as the salient object. The non-salience module 201 may take the average of the frames (e.g., without the foreground) in the video as the background (e.g., slow-moving background), and use the background as the non-salient portions of the video. For example, the salience module 203 extracts a salient portion of a train heading to a train station (e.g., the fast-changing portion) from a video, while the non-salience module 201 includes passengers waiting on the train station (e.g., the slow changing portion) in the non-salient portions. The salience module 203 also uses other motion detection techniques to determine saliency and extract salient objects. In some embodiments, the salience module 203 traces the predominant flow of moving objects in a video, and identifies a moving object that is not in the predomination flow as a salient object. For example, the salience module 203 identifies a salient object of a video being a person running opposite to other people. One skilled in the art will recognize that the salience module 203 may determine other types of salient objects based on motion detection, for example, a salient object that has no vertical movement.

Motion detection techniques are not always applicable in extracting salient objects. It is hard to determine saliency and extract salient objects based on motion detection when there are numerous moving objects in a scene, for example, a busy highway, a crowded store, etc. In some embodiments, the salience module 203 determines saliency and extracts a salient object based on other characteristics of the video such as the contrast, the color, the shape, etc. For example, the salience module 203 may identify a shining point (e.g., a bright flashlight) in a surveillance video of a dark house as a salient object, or identify a salient object with changing brightness (e.g., a fire being put out). In another example, the salience module 203 extracts, from a video, a person wearing a yellow safety vest as a salient object. In yet another example, the salience module 203 identifies a salient object with a round-shape.

In other embodiments, the salience module 203 determines saliency and extracts a salient object based on the semantic information of the video. The semantic information includes activities performed by objects in the video, the meaning of words in a video, etc. For example, the salience module 203 identifies, from a video, a person riding a bike and a person walking on the road, and determines the riding person as a salient object. In another example, the salience module 203 selects a person (e.g., in a blacklist of people) as a salient object.

One approach to separate non-salient portions and salient portions (i.e., portions including salient objects) of a video by the non-salience module 201 and the salience module 203 is a background and foreground separation method. There are sophisticated algorithms that perform background and foreground separation based on motion detection (as described above), color, shape, contrast and other properties. In some embodiments, a Gaussian Mixture Models (GMM) based algorithm is used to build a color model for extracting background and foreground of the video. The salience module 203 updates the model at every time step of the video to account for movement of salient objects and minor illumination changes. In other embodiments, a visual background extractor (ViBe) is used by non-salience module 201 and salience module 203 for background detection and separation from foreground of a video. Other algorithms used by non-salience module 201 and salience module 203 for extracting non-salient portions and salient portions of the video include an adaptive GMM, a self-organizing map algorithm, a principal component analysis algorithm, an algorithm based on low-rank decomposition for modelling background, etc.

Once a salient object is determined, the salience module 203 links the related portions of the salient object to generate a salient fragment. In some embodiments, the salience module 203 determines salient objects in each frame of the video, tracks each salient object over the length of the video, and generates a plurality of salient fragments based on the tracks. A simple way to track the salient object is to locate the position of the salient object from one frame to another frame, and associate the salient object in one frame to the salient object in the next frame that appears at a similar spatial location. However, this tracking method has some problems. For example, objects may overlap, or objects may be confused because of similar color or low illumination conditions, or there may be false detection due to variation in illumination and result in no association between objects, or objects may be moving too fast to prevent frame by frame association from working, etc.

To solve these problems, the salience module 203 uses a tracking algorithm that associates a specific color model and/or a motion vector model to a salient object to obtain a track of the salient object over time. In some embodiments, the salience module 203 uses a Kalman filter method to implement multiple object tracking. In one embodiment, the salience module 203 applies a Hungarian method to determine when to start and stop tracks. The Hungarian method is a combinatorial optimization algorithm that solves an Assignment Problem in polynomial time. The Assignment Problem in optimization or operations research includes finding a maximum weight matching (or minimum weight perfect matching) in a weighted bipartite graph. When tracking the salient object over time, the salience module 203 uses the Hungarian method to associate the right detections to the right tracks using a distance function. In some embodiments, the distance is a Euclidean distance between centers of the foreground detections.

In some embodiments, the salience module 203 defines a track of a salient object as a video fragment. The video fragment includes only the salient portion of the video and lasts for the time duration of the track, and is therefore also referred to as a salient fragment. The salient fragment is a sub-stream for a single salient activity localized in both time space and image space. In some embodiments, the salience module 203 measures a time difference to determine whether an activity is localized in time space, and measures a location difference to determine whether an activity is localized in image space.

Figure 3A:
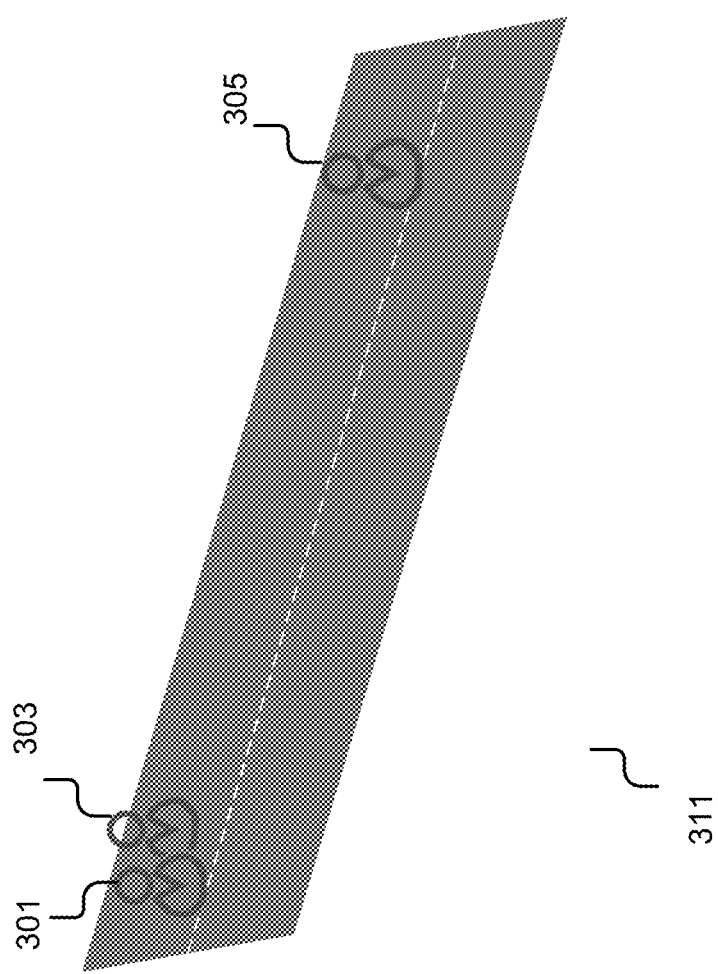
FIG. 3A depicts a graphical representation of a frame of a video including three walking people.

FIG. 3A depicts a frame 311 of a video including three people, person 301, person 303, and person 305. In the example of FIG. 3A, the salience module 203 may identify a first salient fragment corresponding to person 301 and person 303 walking together on one end of the street, and a second salient fragment corresponding to person 305 walking on the other end of the street. The salience module 203 determines the activity of person 301 and 303 to be a single salient fragment localized in both time and image space because the walking activity of person 301 and person 303 occurs in a close time range and in a close location range. However, the salience module 203 determines the activity of person 305 to be a second salient fragment because, while localized in time with the first salient fragment, the activity of person 305 is not localized in image space (i.e., the activity occurs on the other end of the frame) with the activity of person 301 and person 303.

A salient fragment lasts for a time duration of a track. For example, there may be a 30-second salient fragment, a two-minute salient fragment, etc., depending on which salient object is tracked over what time period of the video. In some embodiments, the salience module 203 tracks a single salient object within a certain time period of the video, and generates a single salient fragment from this specific time period. In other embodiments, the salience module 203 tracks multiple salient objects within a certain time period of the video, and generates multiple salient fragments from this specific time period of the video. For example, the salience module 203 may track, from a three-minute period of the video, a person and a car, and generate a first salient fragment of the person and a second fragment of the car. In this case, different salient fragment sequences may include portions of the same images of the video as depicted in FIG. 3C described below.

In some embodiments, the salience module 203 determines the metadata associated with a salient fragment, and transmits the salient fragment along with the metadata to the analysis module 205 and the index 207 for further processing. The metadata associated with the salient fragment includes a start time and a stop time with respect to the original video, the spatial position of frames of the salient fragment in the original video frames, and other attributes (e.g., semantic information such as identification of objects in the image) used for generating a video composition. In some embodiments, semantic information may be used for indexing and retrieval of salient fragments. For example, if the video includes images of cars and pedestrians, where each salient fragment includes metadata that classifies it as either a car or a pedestrian, a query to show all cars could be completed easily based on the semantic information in the metadata.

Figure 3B:
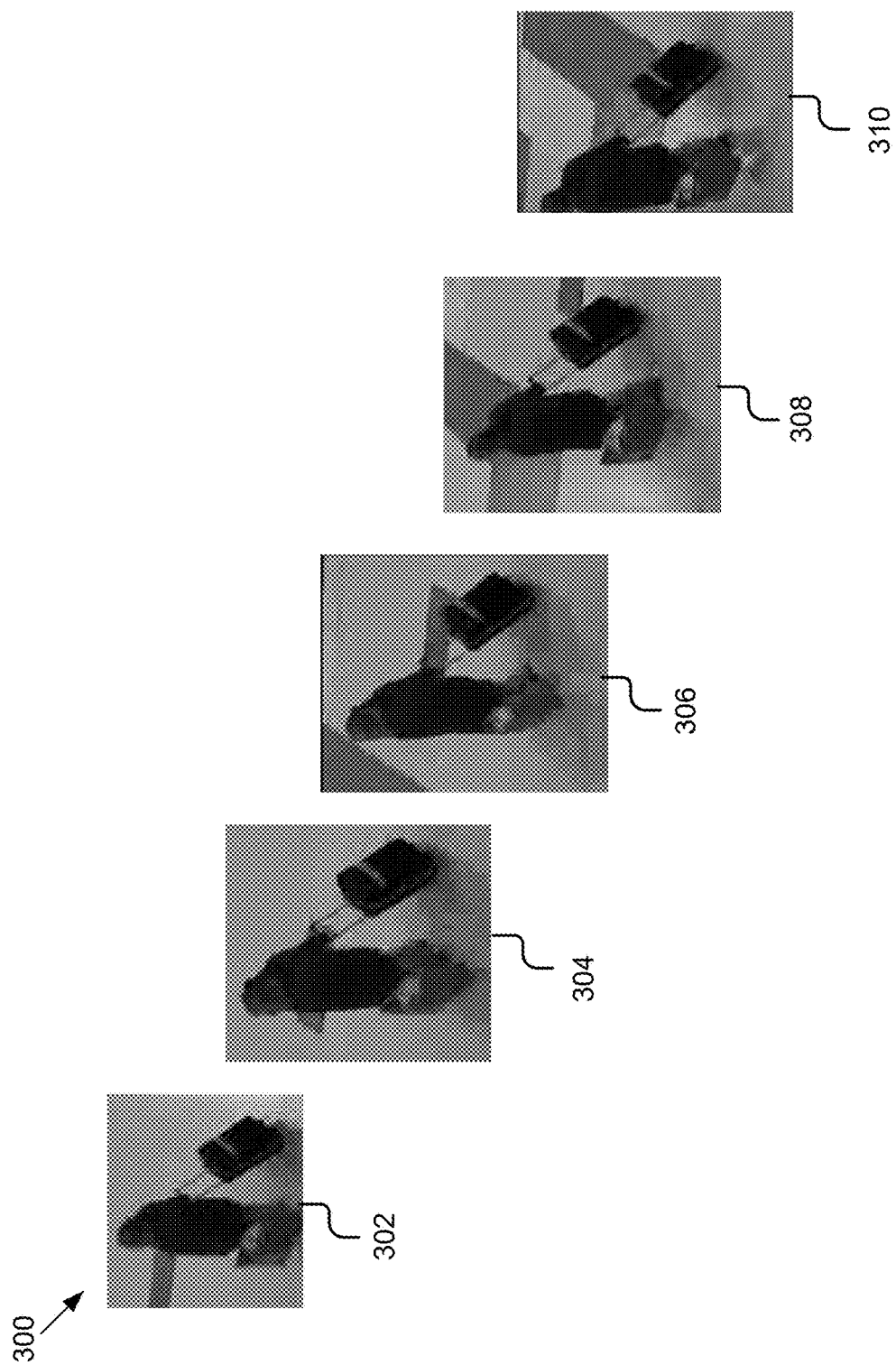
FIGS. 3B and 3C depict graphical representations of salient fragment sequences.
Figure 3C:
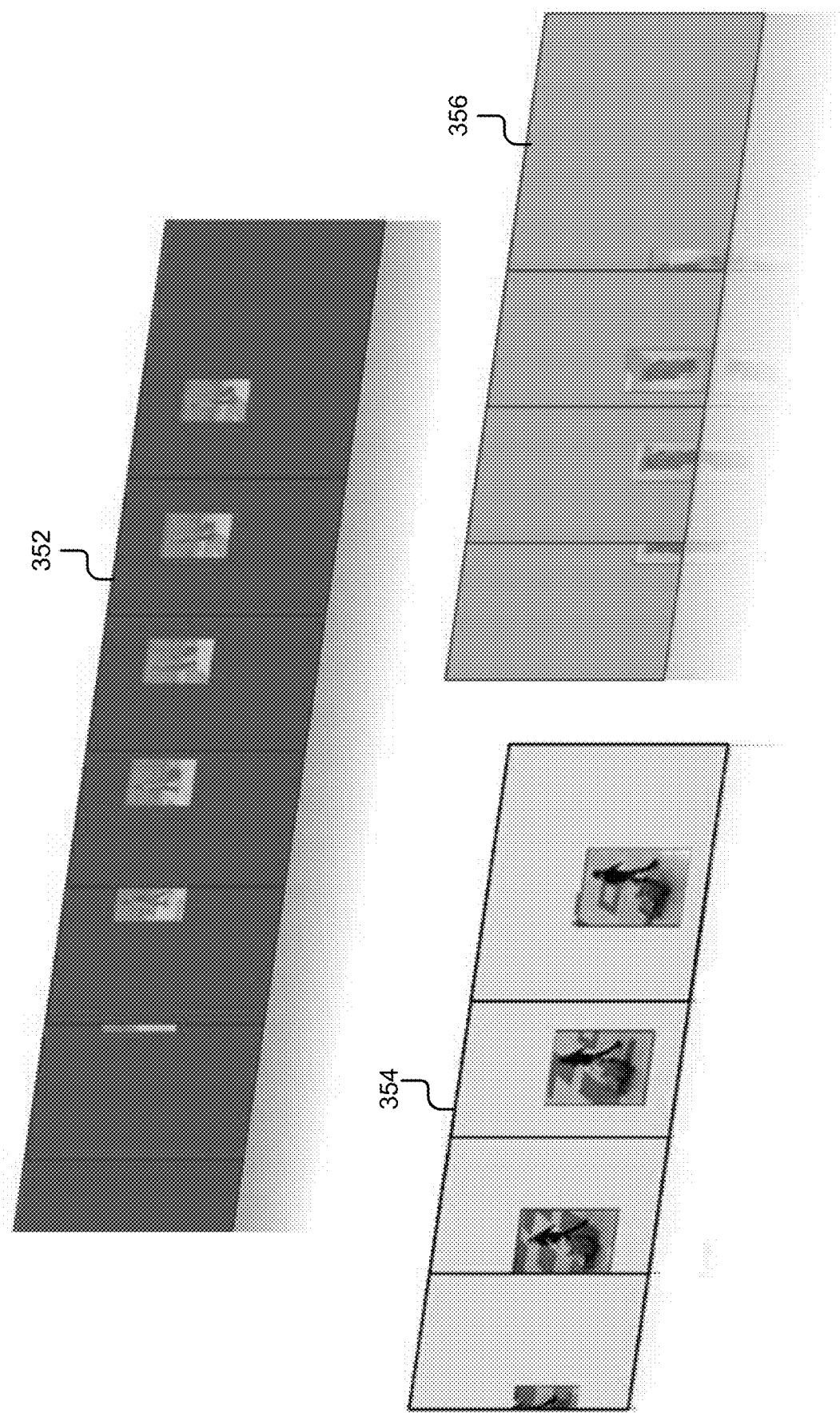

FIGS. 3B and 3C depict graphical representations of salient fragment sequences. The salient fragment sequences shown in the example of FIGS. 3B and 3C are extracted from a surveillance video of a train station by the salience module 203. Images in the examples of FIGS. 3B, 3C, 6, 8, 10A, 10B, 11A, and 11B are taken from the PETS 2006 benchmark data. The salient fragment 300 in FIG. 3B includes five time-related images 302, 304, 306, 308, and 310 of the surveillance video showing a salient object that is generated based on motion detection (e.g., a lady who is walking in the airport). FIG. 3C depicts three salient fragment sequences 352, 354, and 356. Each salient fragment sequence includes a series of images/frames of a salient object. Each frame within a salient fragment contains only a subset of pixels that is found in the original video frame. For example, each frame of the salient fragment 354 includes a subset of pixels of a first salient object (e.g., a person carrying luggage and moving to the right), while each frame of the salient fragment 356 includes a subset of pixels of a second salient object (e.g., a person moving to the left). In the example of FIG. 3C, the salience module 203 may extract the three salient fragment sequences 352, 354, and 356 from the same time interval (e.g., the last two minutes) of the surveillance video based on each salient fragment representing a single salient activity localized in time space and image space.

Returning to FIG. 2A, the analysis module 205 may include software and/or logic to provide the functionality for receiving a plurality of salient fragments, determining related fragments, and generating a connectivity graph that connects the related fragments.

In some embodiments, the analysis module 205 determines that a second salient fragment of the plurality of salient fragments is related to a first salient fragment of the plurality of salient fragments based on a spatio-temporal overlap. For example, the analysis module may determine (1) whether frames of the second salient fragment overlap with the frames of the first salient fragment at a point of time (e.g., time space match), and (2) whether the similarity between features extracted from the second salient fragment and features extracted from the first salient fragment at the point of time overlap is within a predetermined threshold (e.g., image appearance match). Simply speaking, the analysis module 205 identifies two related fragments if the salient objects in respective fragments touch and/or influence each other at some point of time and at some point of the picture.

In some embodiments, the analysis module 205 determines the frame/frames that overlap in time for two salient fragments. A pair of overlapping frames may be the first frame of the first fragment and the last frame of the second fragment, or vice versa. A pair of overlapping frames may also include a frame in the middle of the first fragment from which the second fragment originates or ends, and the first or the last frame in the second fragment. Once the overlapping pair is determined, the analysis module 205 determines whether there is an image appearance match. In some embodiments, the analysis module 205 extracts local features from each frame of the overlapping pair. For example, the analysis module 205 uses the scale-invariant feature transform (SIFT), the features from accelerated segment test (FAST), the rotated binary robust independent elementary features (BRIEF), the oriented FAST and BRIEF (ORB), and other algorithms for detecting features of the frames in the pair. When the number of local features extracted from the frames of the overlapping pair is less than a threshold amount, for example, because the frame size is too small, the analysis module 205 may communicate with the capture device 107 or the data repository 109 to retrieve a higher quality version of the video with an increased foreground resolution. The analysis module 205 then compares the local features extracted from each frame of the overlapping pair to determine whether there is a match, for example, by applying a K-Nearest Neighbors (KNN) algorithm. In some embodiments, the analysis module 205 also applies a random sample consensus (RANSAC) algorithm to discard outliers when comparing the local features extracted from the overlapping pair. The analysis module 205 approximates the changes between frames, which are expected to be small, with a rigid deformation, and uses this rigid deformation to constitute an underlying mathematical model for the RANSAC method. The analysis module 205 determines an image appearance match based on whether the distance measured in the RANSAC step exceeds a threshold distance.

The following is an example of determining related salient fragments based on a spatio-temporal overlap. If a first salient fragment is extracted from the fourth second to the tenth second of a video, and a second salient fragment is extracted from the first four seconds of the video, the analysis module 205 identifies a one-second overlap at the fourth second, and identifies at least one pair of overlapping frames within this one-second video overlap. The analysis module 205 then determines whether there is an image appearance match at the point of time overlap. Suppose features of a person and a bank building are extracted from a pair of overlapping frames. In the first frame of the pair, the person stands close to the entrance of the bank. In the second frame of the pair, the person has walked across the street of the bank. If the analysis module 205 computes the distance between the features extracted from the first and second frames, and determines that the distance is beyond a threshold distance, the analysis module 205 determines that the two salient fragments are unrelated. Otherwise, the two salient fragments are related.

Figure 4:
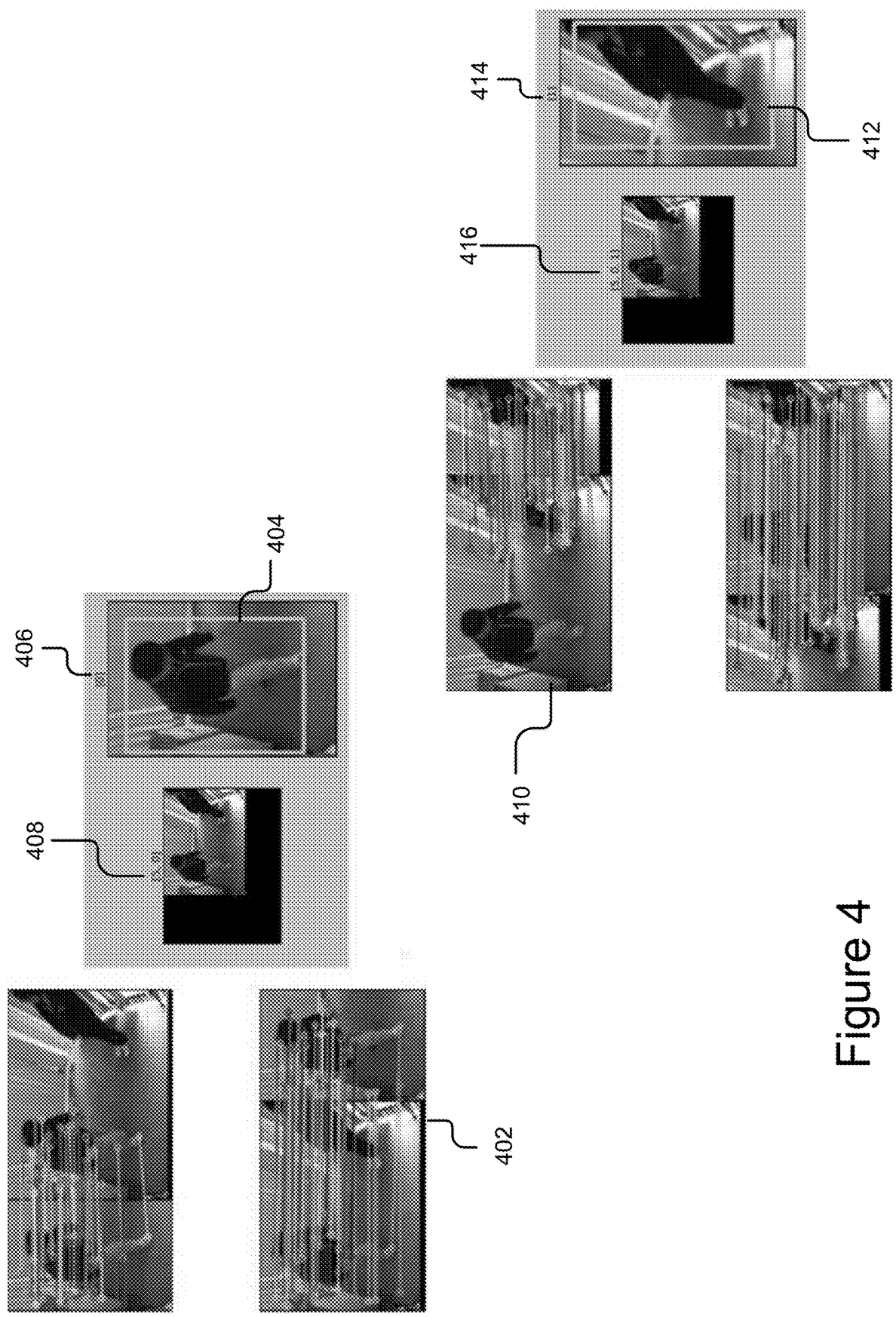
FIG. 4 depicts a graphical representation of related salient fragment sequences determined based on a spatio-temporal overlap.
Figure 10A:
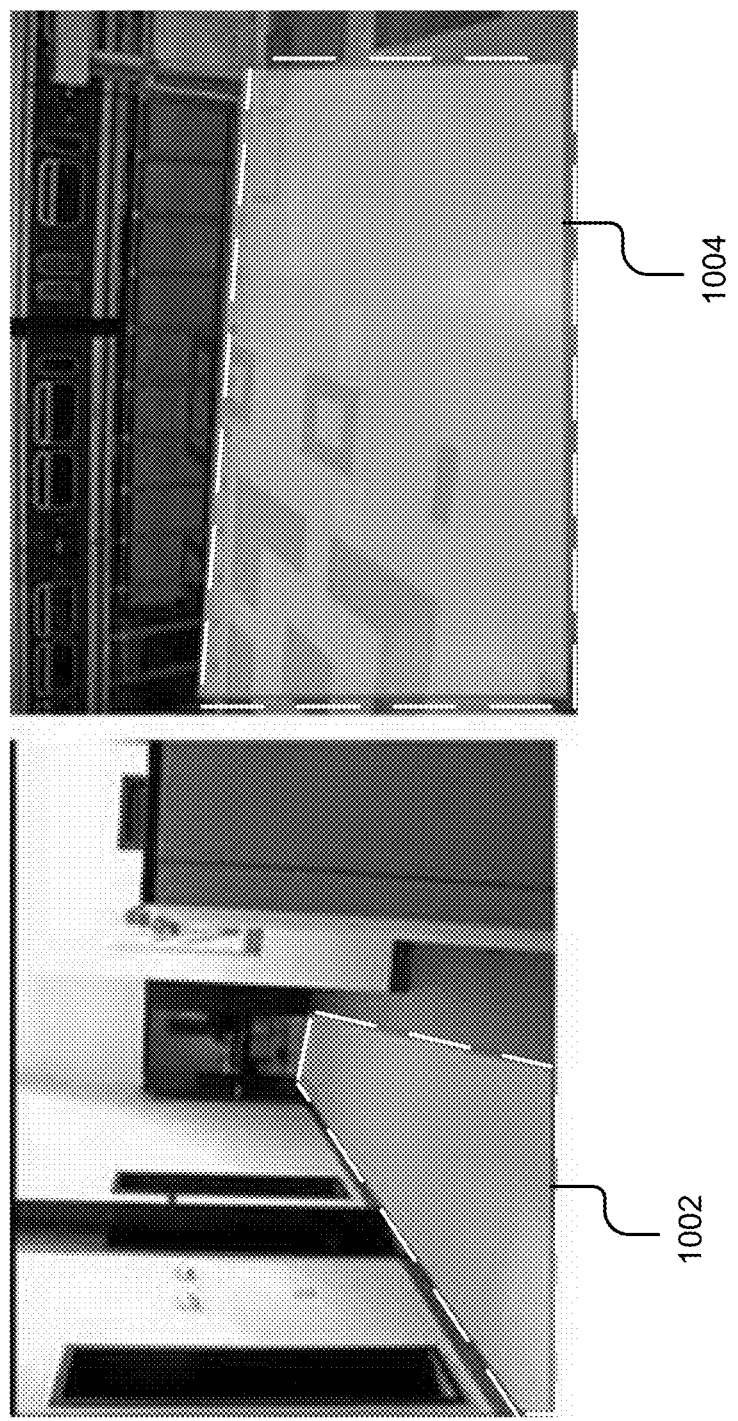
FIG. 10A depicts a graphical representation of a permissible zone of activity.
Figure 10B:
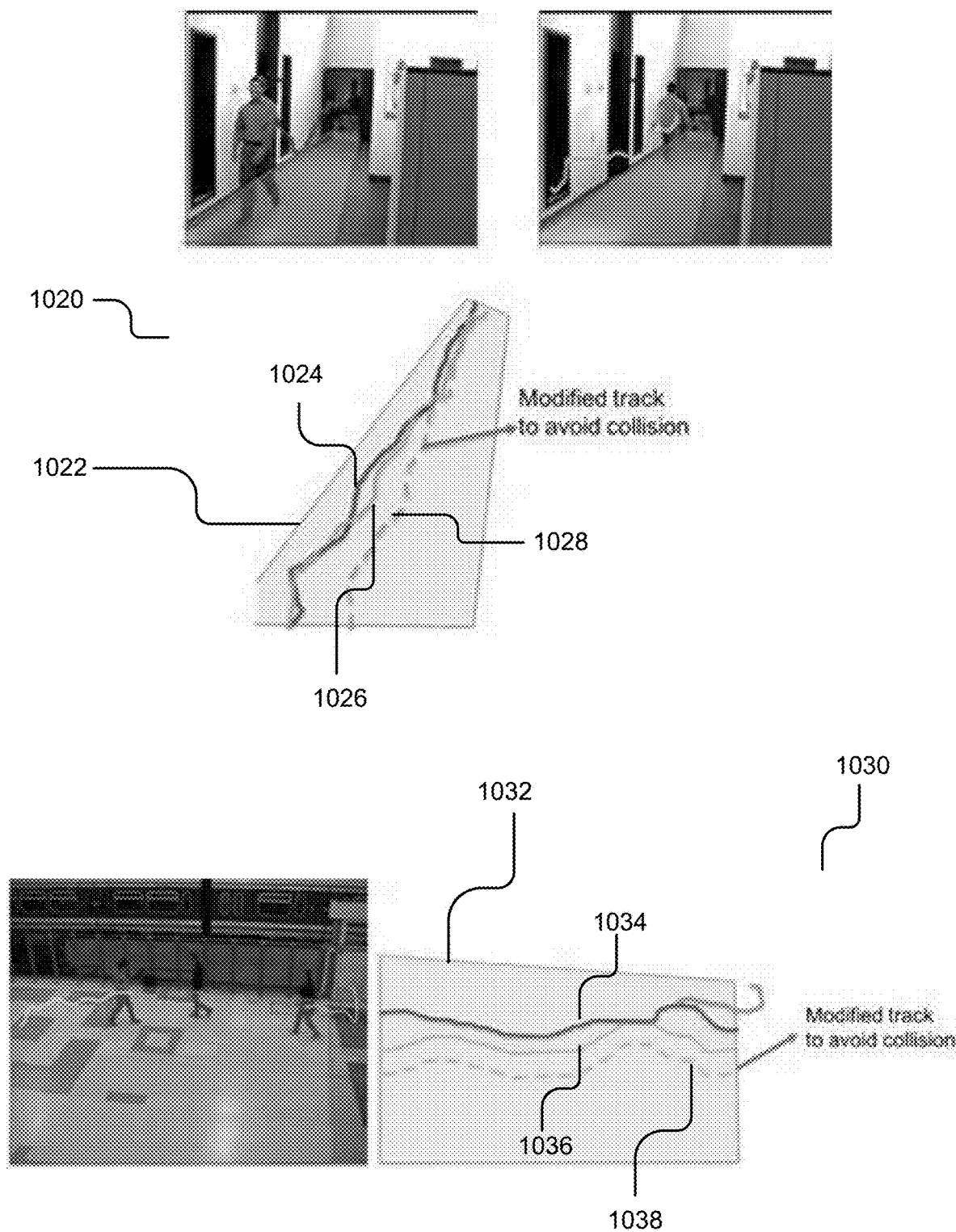
FIG. 10B depicts a graphical representation of a spatial location shift on a permissible zone of activity.

FIG. 4 depicts a graphical representation of related salient fragment sequences determined based on a spatio-temporal overlap. Images in the example of FIGS. 4, 10A, and 10B are taken from a benchmark dataset provided on changedetection.net, see, N. Goyette, P.-M. Jodoin, F. Porikli, J. Konrad, and P. Ishwar, changedetection.net: A new change detection benchmark dataset, in Proc. IEEE Workshop on Change Detection (CDW-2012) at CVPR-2012, Providence, R.I., 16-21 Jun. 2012. On the top left of FIG. 4, a comparison between features extracted from two frames of an overlapping pair is depicted in 402. For example, the two frames may be from fragments 0 and 5, respectively. The comparison result identifies a matched object depicted in box 404, and shows that fragment 0 in 406 is related to fragment 5. The related fragments are labeled as (5, 0) in 408. Similarly, on the bottom right of FIG. 4, a comparison between features extracted from two frames of another overlapping pair is depicted in 410. The two frames are from fragments 1 and 5, respectively. The comparison result identifies a different matched object depicted in box 412, and shows that fragment 1 in 414 is also related to fragment 5. The label (5, 0, 1) in 416 indicates that fragment 5 is related to both fragment 0 and fragment 1 in that similar objects (in boxes 404 or 412) appear in these fragments at both spatial and temporally consistent positions.

In other embodiments, returning to the example of FIG. 2A, the analysis module 205 determines that a second salient fragment of the plurality of salient fragments is related to a first salient fragment of the plurality of salient fragments based on causality information (e.g., the analysis module 205 associates the second salient fragment to the first salient fragment because of cause-and-effect situations). For example, if a man causes an object to fall down upon entering a store or leaving the store, the analysis module 205 would determine that a salient fragment of the falling object is related to a salient fragment of the man.

In some other embodiments, in addition to determining related salient fragments based on appearance (e.g., a spatio-temporal overlap or causality information), the analysis module 205 also applies other approaches to determine the connection or relations between salient fragments. For example, the analysis module 205 may determine related salient fragments based on image properties such as shape, color, contrast, or semantic information extracted from the video such as the activity performed by an object in the salient fragments.

In some embodiments, the analysis module 205 may identify more than one set of salient fragments related to the first salient fragment. For example, if the predetermined threshold distance used in the image appearance match varies, the analysis module 205 may identify varying sets of related salient fragments. Or if a frame of the first salient fragment includes multiple salient objects, the analysis module 205 may determine a first set of related salient fragments based on a first salient object of the first salient fragment, and determine a second set of related salient fragments based on a second salient object of the first salient fragment. When it is unclear about the intention of identifying related fragments, it is especially useful for generating multiple sets of related salient fragments regarding different salient objects of the first salient fragment.

In some embodiments, the analysis module 205 generates a connectivity graph to connect the related salient fragments. The analysis module 205 represents each node of the graph with a salient fragment. The analysis module 205 selects a center node of the graph, for example, a first salient fragment from which a query is generated, and connects other nodes directly or indirectly to the center node of the graph. In some embodiments, the analysis module 205 determines to connect fragments at two nodes in the graph based on a spatio-temporal overlap. For example, the analysis module 205 may connect two nodes in the graph if (1) frames of a fragment at a first node overlap with the frames of the other fragment at a second node at some point in time, and (2) there is an image appearance match between the two fragments at the point of time overlap. In other embodiments, the analysis module 205 also connects the nodes in the graph based on causality information. Accordingly, the analysis module 205 would connect a fragment of a man and a fragment of an object in a graph to show the causality relationship of the man causing the object to fall down instead of the other way around. In some other embodiments, the analysis module 205 may connect salient fragments based on image properties such as shape, color, contrast, or semantic information extracted from the video such as the activity performed by an object in the salient fragments. The analysis module 205 may even determine to connect two fragments in the graph based on a relation defined by a user.

Figure 5:
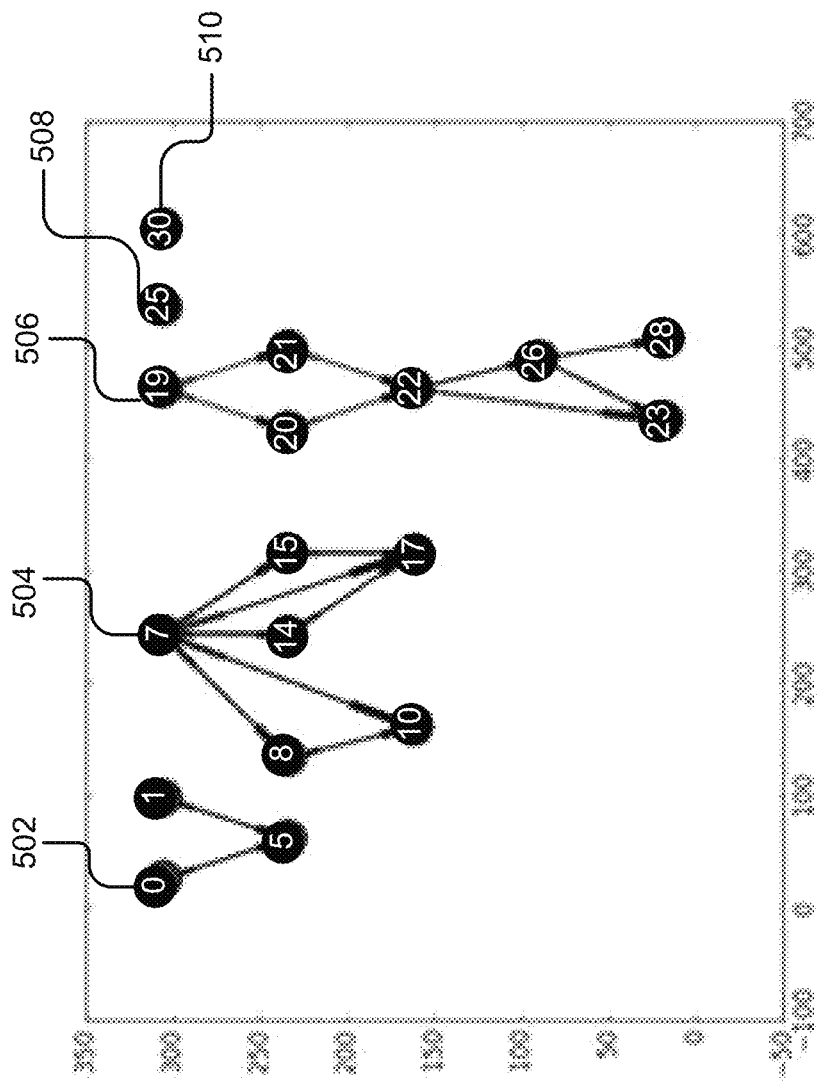
FIG. 5 depicts a graphical representation of clusters of salient fragments in a connectivity graph.

In some embodiments, the analysis module 205 further clusters the salient fragments based on the connectivity in the graph. The analysis module 205 optionally includes a clustering module 215 for classifying the fragments into clusters. Each cluster is a group of fragments that does not connect to fragments contained in any other cluster. The clustering of fragments would maintain the interacting fragments together in their causal order in the graph to retain the interactions between the fragments. FIG. 5 depicts a graphical representation of clusters of salient fragments in a connectivity graph. In the example of FIG. 5, there are five clusters 502, 504, 506, 508, and 510. The fragment in one cluster does not connect to fragments of other clusters. Each cluster includes one or more connected fragments. For example, fragment 5 is associated with fragment 0 and fragment 1 in cluster 502.

In some embodiments, the analysis module 205 communicates with the indexer 207 to create and update a database of salient fragments based on the related salient fragments, the connectivity graph, or clusters. In other embodiments, the analysis module 205 also communicates with the query module 209 and the synthesis module 211 to retrieve a set of salient fragments to generate a video composition.

The indexer 207 may include software and/or logic to provide the functionality for building and indexing a database of salient fragments. A set of salient fragments can then be selected based on querying the database using the index, and combined with the non-salient portions of the video to generate a video composition as described below with reference to the synthesis module 211.

In some embodiments, the indexer 207 stores a plurality of salient fragments received from the salience module 203 and/or the analysis module 205. Each salient fragment is associated with metadata. The metadata includes at least a start time and a stop time of a salient fragment with respect to the original video, the spatial position of frames of the salient fragment in the original video frames, etc. Instead of storing the salient fragments along with the metadata as files, the indexer 207 creates a database for storing such visual information. For example, the indexer 207 creates a database on the data storage 243 to store the salient fragments and metadata.

Storing the salient fragments in a database is particularly advantageous. First, the indexer 207 can index the visual information stored in the database, for example, using the metadata associated with the salient fragments, and thus provide fast retrieval of salient fragments. Second, building and indexing a database of salient fragments enables query-driven reconstruction of the video, which will be described in detail with reference to the query module 209. Third, the database of salient fragments allows informative visualizations. One skilled in the art will recognize that there are other advantages by storing visual information in a database.

In some embodiments, prior to storage, indexing and transmission, the indexer 207 decomposes a salient fragment into short segments of fixed time duration (e.g., one second, three seconds, etc.). Each segment may correspond to a transport stream (TS) file in MPEG transport stream (MPEG-TS) protocol, HTTP Live Stream (HLS) protocol or Dynamic Adaptive Streaming over HTTP (DASH) protocol. For example, the indexer 207 breaks a 21-second fragment into seven segments. Each segment is a TS file that stores a three-second standalone video. In some embodiments, the indexer 207 also adjusts the length of a salient fragment to pack with segments of fixed time duration.

In addition to organizing the salient fragments in the form of segments, the indexer 207 indexes the segments, and stores the index along with the segments and corresponding fragments in the database. Indexing the segments that compose a salient fragment is beneficial. For example, based on the index of segments, it is possible that portions of the salient fragment (e.g., certain segments) instead of the entire salient fragment gets retrieved and returned to a user responsive to a query from the user. Therefore, transmission time and network bandwidth will be reduced.

The indexer 207 indexes the database of salient fragments to improve the speed of data retrieval from the database because the number of records in the database that need to be searched is limited when the indexes are used to locate and retrieve the data. The indexer 207 also updates the database to reflect the changes to the salient fragments. In some embodiments, the indexer 207 indexes the database of salient fragments based on metadata associated with the salient fragments such as a start time and a stop time of a fragment. In other embodiments, the indexer 207 indexes the database of salient fragments based on a connectivity graph of the salient fragments. When the connectivity graph is generated by the analysis module 205 based on a spatio-temporal overlap, the indexer 207 indexes the salient fragments that are close in appearance and near in time. When the connectivity graph is generated by the analysis module 205 based on causality information, the indexer 207 indexes the salient fragments that have cause-and-effect relationships. In some other embodiments, the indexer 207 may also index the database of salient fragments based on clustering information received from the analysis module 205. For example, the indexer 207 may respectively assign a cluster number A, B, C, D, and E to five clusters shown in the graph of FIG. 5, and index the salient fragments in FIG. 5 such that each fragment can be accessed based on the corresponding cluster number A-E. As a result, fragments 0, 1, and 5 can be accessed based on the cluster number A, fragments 7, 8, 10, 14, 15, and 17 can be accessed based on the cluster number B, and so on.

There may be multiple variations to how the indexer 207 communicates with the analysis module 205 to create and update the database of salient fragments. In some embodiments, the indexer 207 receives salient fragments from the salience module 203, and creates/updates the database of salient fragments. The analysis module 205 then retrieves salient fragments related to a query of a salient fragment (e.g., based on a relation defined by a user), and generates a connectivity graph connecting the related fragments. In some embodiments, the analysis module 205 generates a connectivity graph of related fragments, and transmits the fragments in the graph to the indexer 207 for creating and updating the database of salient fragments. In other embodiments, the analysis module 205 generates a connectivity graph of related fragments and transmits the fragments in the graph to the indexer 207. The indexer 207 creates and updates the database of salient fragments based on the graph. The analysis module 205 then retrieves the salient fragments from the database and clusters fragments based on the graph connectivity. In some other embodiments, the analysis module 205 generates a connectivity graph of related fragments and clusters the fragments based on the connectivity in the graph, and transmits the fragments in the graph along with the clusters to the indexer 207 for creating and updating the database of salient fragments based on the graph and the clusters. These variations will be described below in detail with reference to FIGS. 13A-D.

The query module 209 may include software and/or logic to provide the functionality for generating a query based on a user input and querying the database of salient fragments. In some embodiments, the query is related to a salient fragment. For example, the query module 209 generates a query related to a salient fragment responsive to a user selection of a portion of the video corresponding to the salient fragment. The query module 209 queries the database of salient fragments to retrieve all fragments related to the queried salient fragment. The relation is indicated in the connectivity graph, or the relation is defined by the user. The query may also be related to more than one salient fragment. For example, the query module 209 generates a query related to a first salient fragment and a second salient fragment. In other embodiments, the query is a time interval. For example, the query module 209 generates a query for querying all fragments within a time interval based on user input. In other embodiments, the query may be an attribute associated with salient fragments of the plurality of salient fragments. For example, the query may be to show objects in a particular direction of motion (e.g., a predominant direction). One skilled in the art will recognize that there are many other types of queries or combinations of queries, for example, queries based on tags, keywords, metadata. In some embodiments, the query module 209 communicates with the synthesis module 211 to retrieve a set of salient fragments based on the query for synthesizing a video composition.

Figure 6:
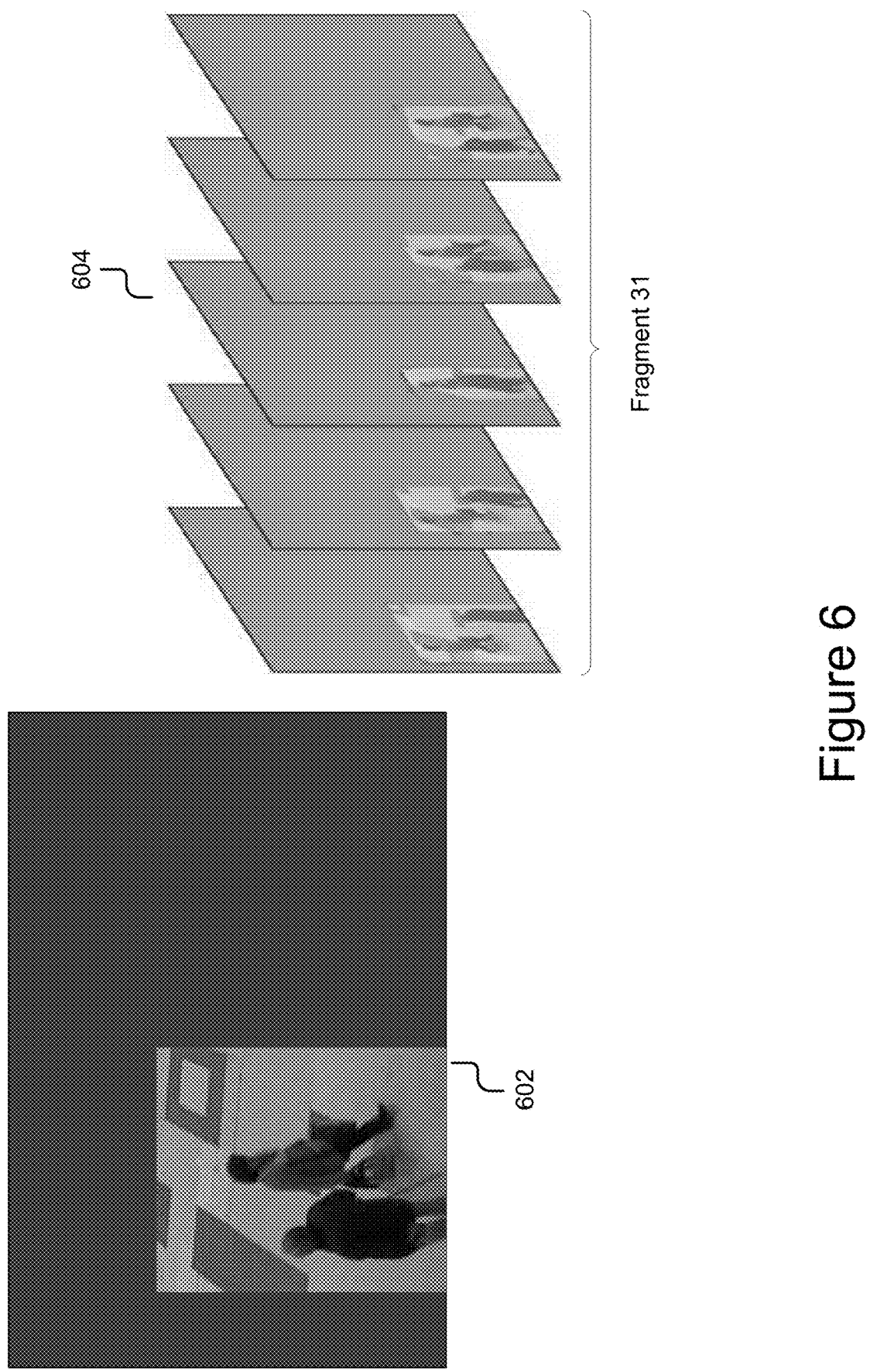
FIG. 6 depicts a graphical representation of a query fragment generated based on a user input.
Figure 7:
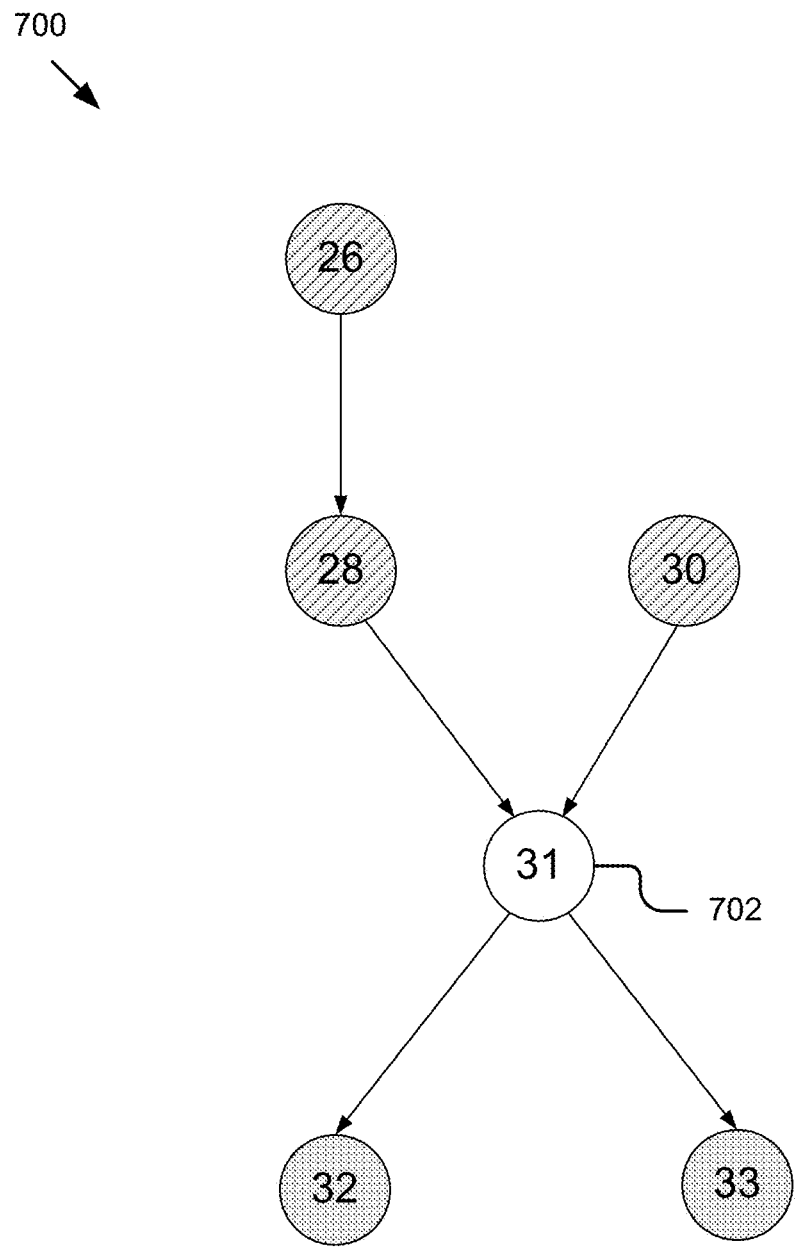
FIG. 7 depicts a connectivity graph connecting salient fragments related to the query fragment shown in FIG. 6.
Figure 8:
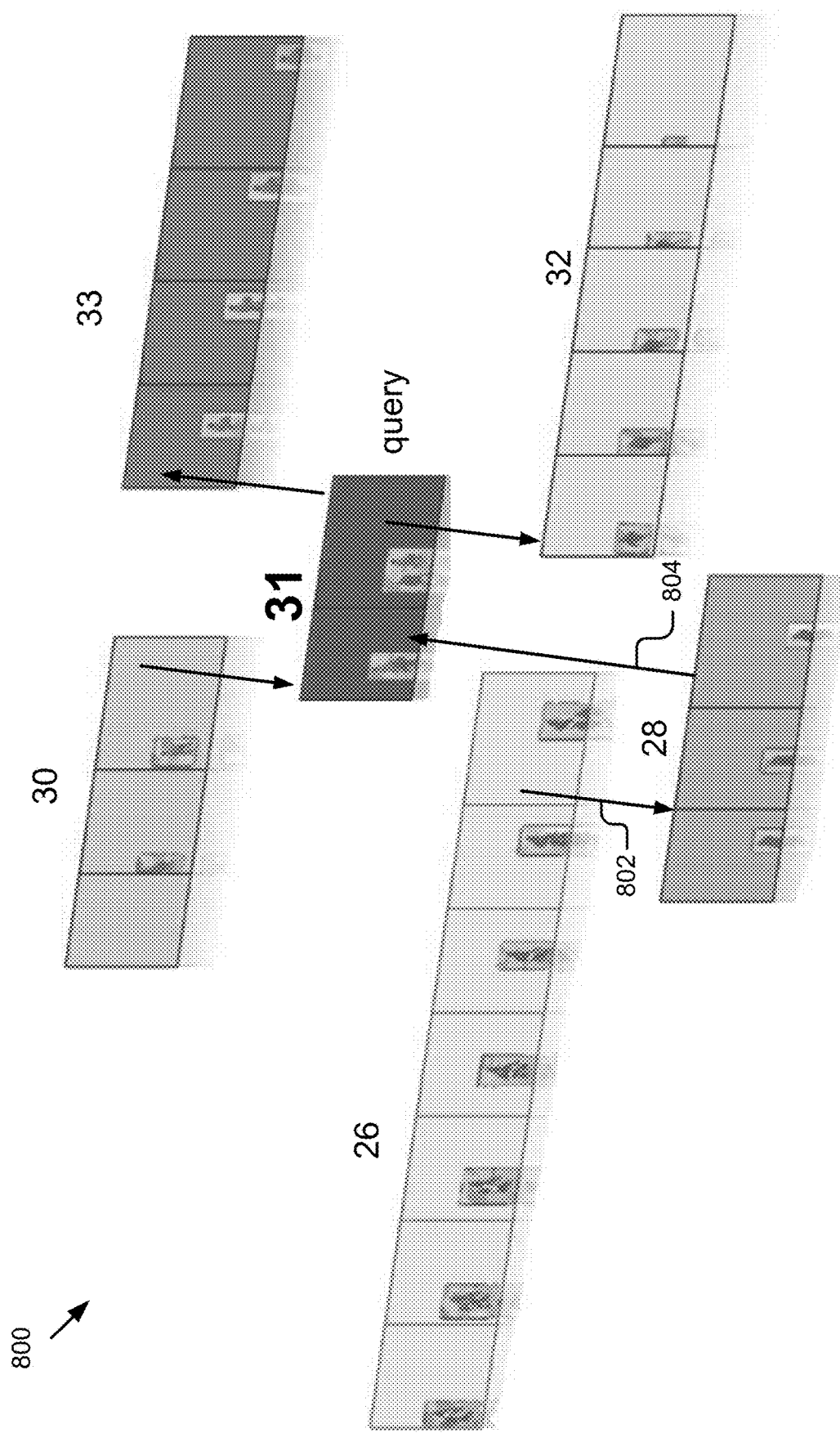
FIG. 8 depicts a graphical representation of salient fragments shown in the connectivity graph of FIG. 7.

FIGS. 6-8 depict graphical representations of a query fragment and retrieved salient fragments related to the query fragment. FIG. 6 depicts a graphical representation of a query fragment generated based on a user input. The salience module 203 extracts a plurality of salient fragments from a surveillance video of an airport, and the indexer 207 stores and indexes the salient fragments in a database. When a user (e.g., an analyst) selects a portion of an image/frame 602 of the surveillance video, it triggers the query module 209 to generate a query fragment 604. The query fragment 604 includes the frame 602, and is also referred to as fragment 31 according to its index.

The query module 209 generates a query fragment for querying the database to retrieve related fragments. In the example of FIG. 6, there is no clue why the user is interested in fragment 31. Maybe the user is interested in what happened when the two people in image 402 crossed over each other, or maybe the user wants to know what is inside the bags held by the lady in the image, etc. Although the user's intention of selecting image 402 might not be known, the system 100 can still provide a smart recommendation of what the user should further inspect from the video, for example, by retrieving the fragments that are related to the query fragment in a connectivity graph.

FIG. 7 depicts a connectivity graph 700 connecting the salient fragments related to the query fragment shown in FIG. 6. The graph 700 includes six nodes, each node representing a salient fragment. The center node 702 is fragment 31 from which the query was generated. The analysis module 205 identifies and connects fragments 26, 28, 30, 32, and 33 related to fragment 31 based on a spatio-temporal overlap (e.g., the analysis module 205 connects two fragments because same salient object(s) appear in the two fragments, and the salient object(s) in one fragment interacts with the salient object(s) in the other fragment). The fragments 26, 28, and 30 shown with a slash background are fragments in a preceding time relative to the query fragment 31 at the center node, and the fragments 32 and 33 shown with a square background are fragments in a subsequent time relative to the query fragment 31. Accordingly, if fragment 31 is extracted from the surveillance video between 10:30 to 10:33 am, the fragments 26, 28, and 30 may be between 10:29 to 10:31 am, and the fragments 32 and 33 may be between 10:32 to 10:35 am. There is also an image appearance match between fragment 31 and the related fragments 26, 28, 30, 32, and 33. For example, the analysis module 205 may exclude fragment 29 from the graph 700 because fragment 29 includes a person that stands at a position far from the two people in fragment 31. FIG. 8 depicts a graphical representation 800 of salient fragments shown in the connectivity graph 700 of FIG. 7. The arrows indicate the connections between the related salient fragments. For example, the arrows 802 and 804 indicate that fragment 26 connects to fragment 31 through fragment 28 in the graph 700.

Returning to the example of FIG. 2A, the synthesis module 211 may include software and/or logic to provide the functionality for synthesizing a video composition responsive to receiving a query about a video. The video composition emphasizes the information of the original video corresponding to the retrieved salient fragments based on the query. In contrast, the video composition excludes information contained in the rest of the salient fragments (i.e., those fragments that are not retrieved). The video composition is different from the original video, but it is a plausible and correct video content.

Figure 2B:
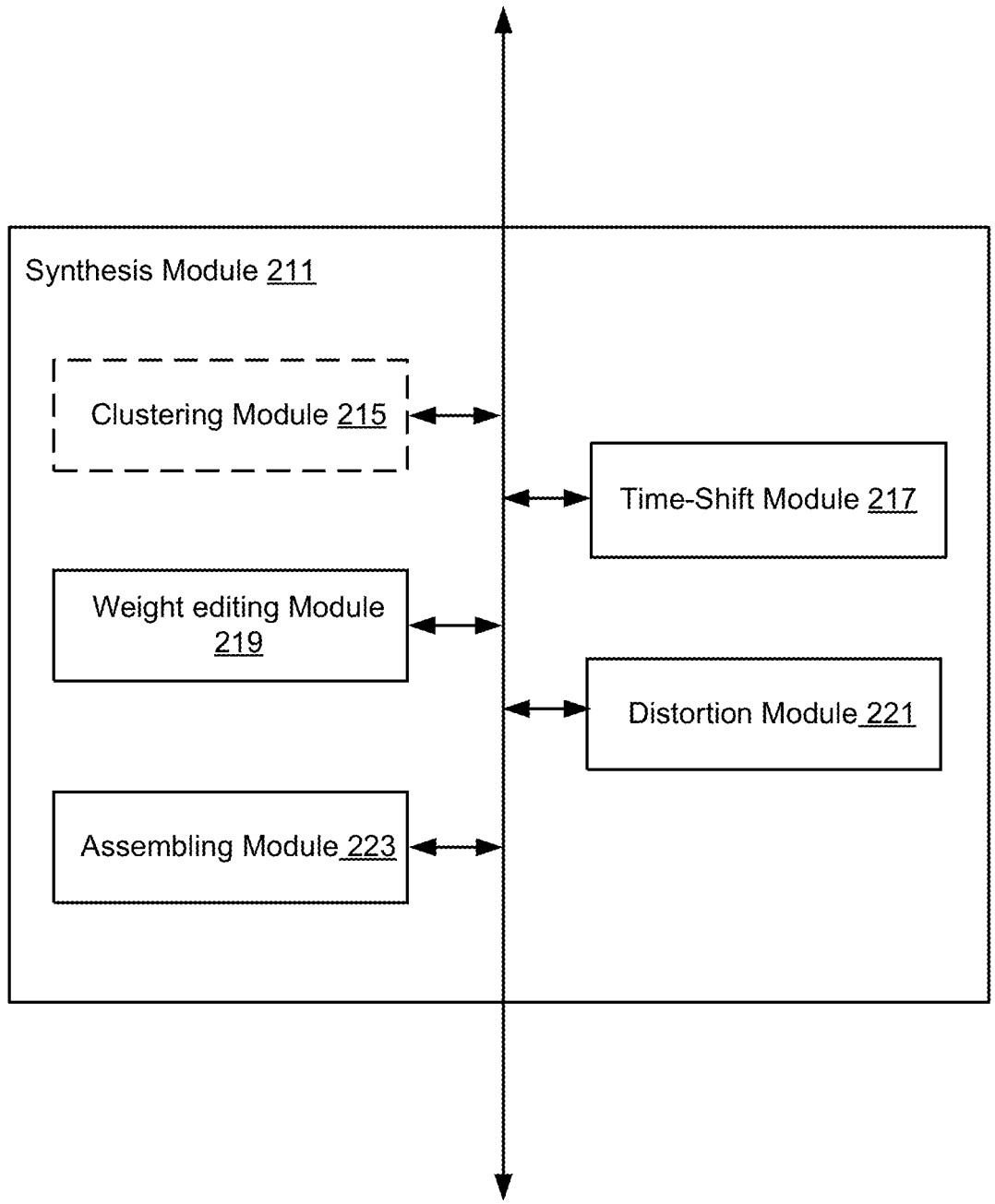
FIG. 2B depicts a block diagram illustrating one embodiment of a synthesis module.

FIG. 2B depicts a block diagram illustrating one embodiment of a synthesis module 211. In FIG. 2B, the synthesis module 211 includes an optional clustering module 215, a time-shift module 217, a weight editing module 219, a distortion module 221, and an assembling module 223.

The clustering module 215 may include software and/or logic to provide the functionality for classifying the salient fragments into clusters. In some embodiments, when the synthesis module 211 receives a query of a time interval, the synthesis module 211 communicates with the query module 209 to retrieve all fragments that occur within the time interval, and generate a video composition based on these fragments and start stop times associated with the fragments. However, if the reassembled video is long or contains large periods of inactivity, the synthesis module 211 may create a synopsis video. The synopsis video is a video composition where multiple fragments taking place at different points of time in the original video interval are stacked together and displayed simultaneously thereby reducing the length of the video. For example, the query module 209 may generate a query based on an input of a user asking to see all activities between 1:46 pm to 2:46 pm of a video in a five-minute video composition. The synthesis module 211 then generates a five-minute synopsis video responsive to the five-minute time duration request included in the query. The term "video composition" and "synopsis video" may be interchangeably used in the description herein.

One challenge in generating a synopsis video relates to causal relationships of video fragments. The synthesis module 211 cannot rearrange causal interactions in the video without regard to ordering of the various fragments. If so, the resulted synopsis would not be meaningful. For example, rearranging the fragments 26, 28, 30, 31, 32, and 33 in FIGS. 6-8 may result in a synopsis video that makes no sense. In some embodiments, the synthesis module 211 includes a clustering module 215 to retain the causal interactions in a synopsis video. Responsive to the query, the clustering module 215 may communicate with the query module 209 to retrieve salient fragments associated with the time interval as well as an associated connectivity graph. The clustering module 215 classifies the graph into clusters based on the connectivity through a connected component. A cluster is a group of fragments that does not connect to fragments contained in any other cluster, for example, the clusters shown in FIG. 5. In other words, fragments amongst different clusters have no spatio-temporal relationship or causality relationship. The clustering maintains all interacting fragments together in their causal order in a cluster. The clustering module 215 transmits the clusters to the assembling module 223 to finalize a synopsis video based on time-shifting the clusters to ensure that multiple clusters could occur simultaneously.

As described above, in some embodiments, the clustering module 215 may also be optionally included in the analysis module 205 such that the clustering can be performed before database creation and therefore allow for faster query retrieval. As a result of clustering the connectivity graph, the indexer 207 may index the database of salient fragments not only based on start and stop times or graph connectivity, but also based on the clustering information such as cluster numbers.

The time-shift module 217 may include software and/or logic to provide the functionality for determining a time shift for ordering the salient fragments and/or clusters when generating a synopsis video. In order for the synopsis video to be visually appealing, the time-shift module 217 determines one or more time shifts to minimize the overlap between the objects in different fragments. Considering a video where many fragments occur at different points of time in the video and occur at the same spatial position in the video frame, the time-shift module 217 performs the synopsis optimization by placing the fragments in time with appropriate time-shifts such that the overall time of the synopsis video and the spatial overlaps between multiple fragments in the synopsis video are reduced.

In some embodiments, the time-shift module 217 uses an energy function to compute an appropriate time shift for the fragments in the synopsis video such that the overlap is zero or minimal, and overall synopsis length is small or is close to the length requested by a user. In some embodiments, the time-shift module 217 also communicates with the other modules of the synthesis module 211 to extend this synopsis optimization for fragments to the clusters so that, when creating the synopsis, no interactions or causal activities are broken. For example, when generating the synopsis video, the modules 215, 217, and 223 may communicate to time-shift the clusters so that multiple clusters occur simultaneously in the synopsis video.

Fragments occurring in the same spatial position in frames of the synopsis video are referred to herein as a collision. One goal of the time-shift based optimization performed by the time-shift module 217 is to create a synopsis video with minimal collision. The time-shift module 217 may use an energy function to determine a collision cost, or use other methods to obtain the synopsis video. For example, the time-shift module 217 may increase the background area and/or reduce the foreground area to incorporate as many video fragments simultaneously as possible, with little or zero collision. This method may create a smoother video but require more computation to increase the background or scale down or up the foreground.

The weight editing module 219 may include software and/or logic to provide the functionality for assigning a weight to a salient fragment based on the movement of a salient object of the fragment. The weight editing module 219 weights the fragments to solve a problem that is related to stationary objects in generating a synopsis video.

Figure 9A:
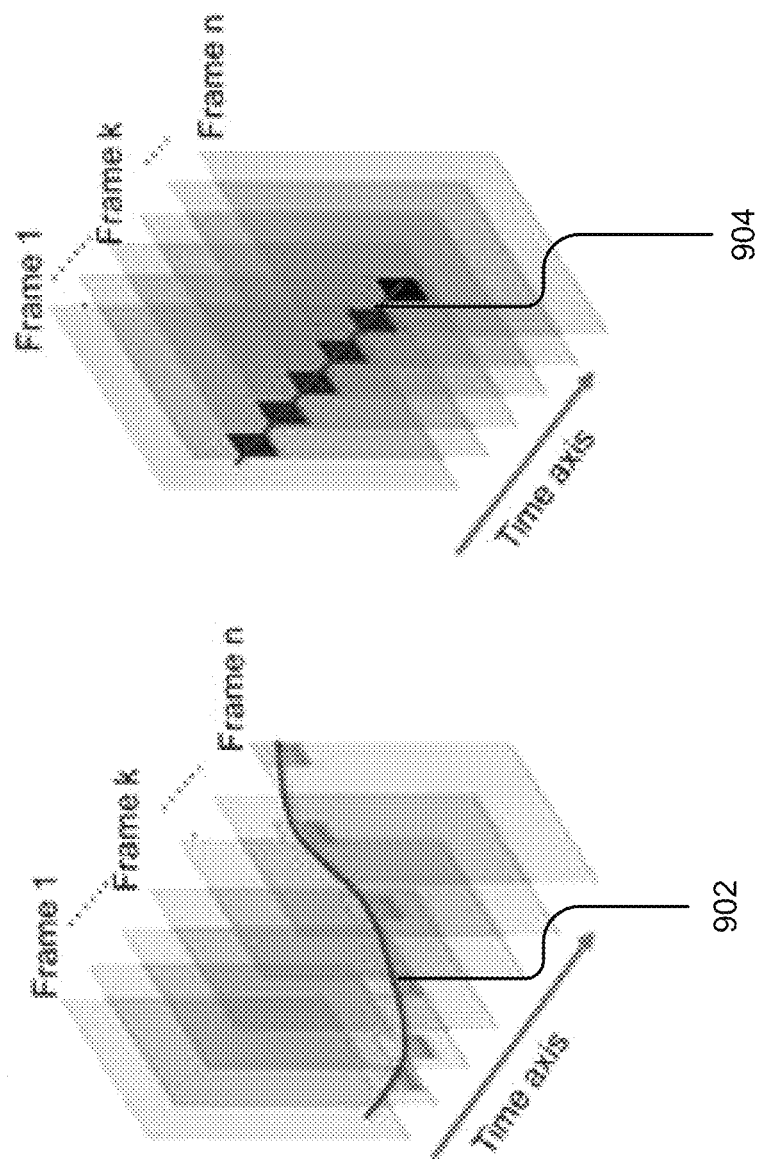
FIG. 9A depicts a graphical representation of trajectories of a stationary object and a moving object.
Figure 9B:
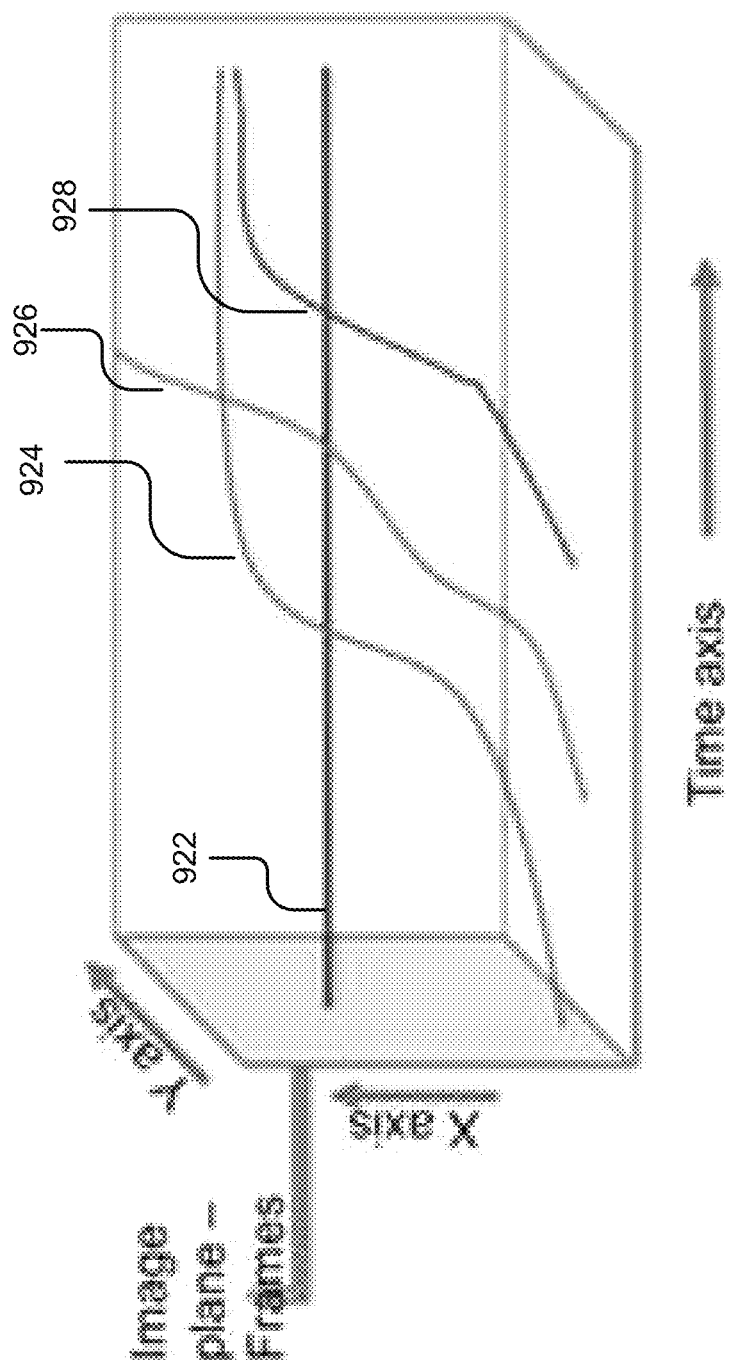
FIG. 9B depicts a graphical representation of trajectory interactions between a stationary object and moving objects.

Let us consider a left baggage scenario. In this scenario, baggage (e.g., a suitcase) enters a scene of a video and remains there throughout the rest of the duration of the video. During this time duration, multiple people walk by the unattended baggage, blocking its view from the camera. As a result, many fragments interact with the same long fragment of the baggage as the baggage remains planted in the same spot. That is, the long fragment corresponding to the unattended baggage is connected to many other fragments. Consequently, when the clustering module 215 clusters the connectivity graph generated from the video by the analysis module 205, the clustering module 215 would determine a very large cluster that is almost as long as the length of the video. As a result, a synopsis video generated using such a cluster will have no reduction in time. FIG. 9A depicts a graphical representation of trajectories of a stationary object and a moving object. In the left side of FIG. 9A, the trajectory of a moving object is shown with the curved line 902 of the moving center of the object. In the right side of FIG. 9A, the trajectory of a stationary object is shown with the straight line 904 of the unmoving center of the object. FIG. 9B depicts a graphical representation of trajectory interactions between a stationary object and moving objects, for example, how a trajectory of stationary object shown in 922 interacts with the trajectories of moving objects shown in 924, 926, and 928 throughout the length of time.

In some embodiments, to overcome the limitation associated with the stationary objects, the weight editing module 219 associates a weight with a salient fragment based on measuring how much a salient object of the fragment has moved over a period of time. For example, the weight editing module 219 may associate a small weight to a salient fragment of an object that is stationary for an entire stretch of the video, and associate a large weight to a salient fragment of a moving object. In some embodiments, for the objects that frequently stop and move in salient fragments of the video, the weight editing module 219 separates the salient fragments into small chunks, and assigns the weights to the small chunks of the salient fragments. For example, the weight editing module 219 chooses a certain number of contiguous frames in the video (e.g., 50), and determines whether an object has moved in these frames. If the object has moved, the weight editing module 219 assign a higher weight. Otherwise, the weight editing module 219 assigns a lower weight. In some embodiments, the weight editing module 219 measures the movement of a salient object in the fragment or chunk of frames based on how much the center of the salient object has moved from first to the last frame in the fragment or the chunk of frames as shown in FIG. 9A.

In some embodiments, the weight editing module 219 assigns a binary weight to a fragment. For example, the weight editing module 219 determines that a fragment of a stationary object has zero weight, and a fragment of a moving object has a weight of one. In other embodiments, the weight editing module 219 associates continuous values of weights to fragments. In some embodiments, the weight editing module 219 may also extends the weighting to clusters determined by the clustering module 215. Once the weights are determined, the weight editing module 219 notifies the assembling module 223 to create the synopsis video based on the weights, for example, considering the weights of the fragments to determine whether to associate a collision cost to the creation of the synopsis video.

In some embodiments, the weight editing module 219 also stacks or layers fragments (e.g., assigns each fragment to a different stack order or layer based on the weight) when generating the video composition. The weight editing module 219 may locate a fragment with a low weight at the bottom of the stack and a fragment with a high weight on the top of the stack. If portions of two fragments (after time-shifting) overlap, the overlapping portions corresponding to the fragment with the lower weight will be occluded by images from the fragment with the higher weight. In some embodiments, the weight editing module 219 stacks the fragments based on the level of movement. For example, the weight editing module 219 may treat stationary objects similar to that of background and places the stationary objects at the bottom layer. If there is an overlap, the stationary object image in a lower layer will be occluded by a moving object image in a higher layer.

There are various advantages for weighting fragments or clusters. First, a weight determines how many collisions the fragment can undergo. For example, in the case of stationary fragments having zero weight, as many collisions as possible can be used in the synopsis generation by multiplying the collision cost with the weight. The weight editing module 219 therefore allows to incorporate an energy function with the weights to determine the collision cost instead of using the energy function only to determine the collision cost as described above with reference to the time-shift module 217. Another advantage of weight editing is that different fragments can be layered, for example, based on the level of movement, and therefore improves the quality of images such as blurriness, corner sharpness, etc. Further, the weight editing reduces the number of frames of non/slow moving objects by skipping frames when the fragments have a low weight, and thereby reduces the consumption of network bandwidth and other resources.

The distortion module 221 may include software and/or logic to provide the functionality for determining a spatial shift based on identifying a permissible zone of activity of a video. When generating a synopsis of the video, the distortion module 221 determines the spatially shifted locations for placing the fragments in the synopsis video to reduce the number of collisions caused by coincident and bidirectional traffic in the video.

So far when there are many clusters of fragments happening at the same spatial position of a video, the time-shift module 217 determines a time shift to achieve the reduction in time. However, if the video also includes different objects that move in opposite directions, the time-shifting method used by the time-shift module 217 cannot avoid some collisions. In such cases, collisions cannot be minimized effectively without increasing the synopsis time. In other words, the time-shifting method cannot entirely solve the collision problems caused by coincident and bidirectional traffic.

In some embodiments, the distortion module 221 may apply a spatio-temporal fragment distortion method to minimize the number of collisions. In some embodiments, the distortion module 221 identifies, from non-salient portions of a video, a region where most of the salient activity happens. This region is also referred to as a permissible zone of activity. FIG. 10A depicts graphical representations of example permissible zones of activity. In FIG. 10A, the regions 1002 and 1004 in dash-lined boxes are permissible zones of activity, where most of the movements takes place in a video. Once the permissible zone of activity is identified, the distortion module 221 communicates with the time-shift module 217 to determine how many fragments can be simultaneously overlaid by distorting them both temporally and spatially. In other words, the distortion module 221 spatially moves a salient object in some frames of the fragments by a certain amount to reduce the overall collision cost. The amount of movement of the object is constrained by the permissible zone of activity and smoothness of overall trajectory of the fragments. In some embodiments, the distortion module 221 determines a permissible zone of activity based on a user input. In other embodiments, the distortion module 221 determines the permissible zone of activity automatically by determining a level of activity in the overall image plane considering all fragments simultaneously.

In order to create the synopsis video, the distortion module 221 determines if multiple fragments can be played simultaneously by placing the fragments in spatially shifted locations such that the collision cost is minimal. The spatial shift is constrained by the permissible zone of activity. Since the non-salient portions of the video cannot be altered, the distortion module 221 distorts the fragments to reduce collisions. The distortion module 221 keeps the size of the non-salient portion or the scale of the salient fragments unchanged, and thus reduces the overall computational burden that was associated with increasing background or reducing the foreground.

FIG. 10B depicts a graphical representation of a spatial location shift on a permissible zone of activity. In scenario 1020, the distortion module 221 identifies a permissible zone of activity as shown by the bounding box 1022, and detects the collisions as indicated by the interactions of the trajectories 1024 and 1026. The distortion module 221 then shifts the trajectory 1026 to the trajectory 1028 to reduce the number of collisions, meaning there are fewer interactions between the trajectory 1024 and the trajectory 1028 than the interactions between 1024 and 1026. Similarly, in another scenario 1030, the distortion module 221 identifies a permissible zone of activity shown by the bounding box 1032, and detects the collisions shown as the interactions of the trajectories 1034 and 1036. The distortion module 221 shifts the trajectory 1036 to the trajectory 1038 to reduce the number of collisions. In these scenarios, the two fragments when played simultaneously result in collisions due to people travelling in opposite directions, and said collisions cannot be avoided by small time-shifts. However, by spatial shifting the frames of one of the fragments as shown by the dashed line, the number of collisions is reduced.

Returning to FIG. 2B, the assembling module 223 may include software and/or logic to provide the functionality for generating a video composition. In some embodiments, the query module 209 generates a query relating to a video based on a user input. The query can be a salient fragment, a time interval, or an attribute associated with salient fragments. Responsive to the query, the assembling module 223 communicates with the clustering module 215, the time-shift module 217, the weight editing module 219, and the distortion module 221 to retrieve a set of salient fragments, non-salient portions of the video, the time-shift information, the weights associated with the salient fragments, the spatial-shift information, etc., and generate a video composition of the video using the set of salient fragments and the non-salient portions based on the time-shift information, the weights associated with the salient fragments, and the spatial-shift information. In some embodiments, the modules 223, 215, 217, 219 and 221 may communicate with each other to retrieve, from a plurality of salient fragments extracted from a video, a first set of salient fragments based on a first query to generate a first video composition. These modules may also work together to retrieve, from the first set of salient fragments, a second set of salient fragments based on a second query to generate a second video composition, and so on. In this way, a hierarchy of video composition is formed. For example, a first video composition including a first person and a second person is generated based on a first query from a first set of salient fragments, and a second video composition including only the second person is generated based on a second set of salient fragments retrieved from the first set of salient fragments responsive to a second query of the second person.

Figure 11A:
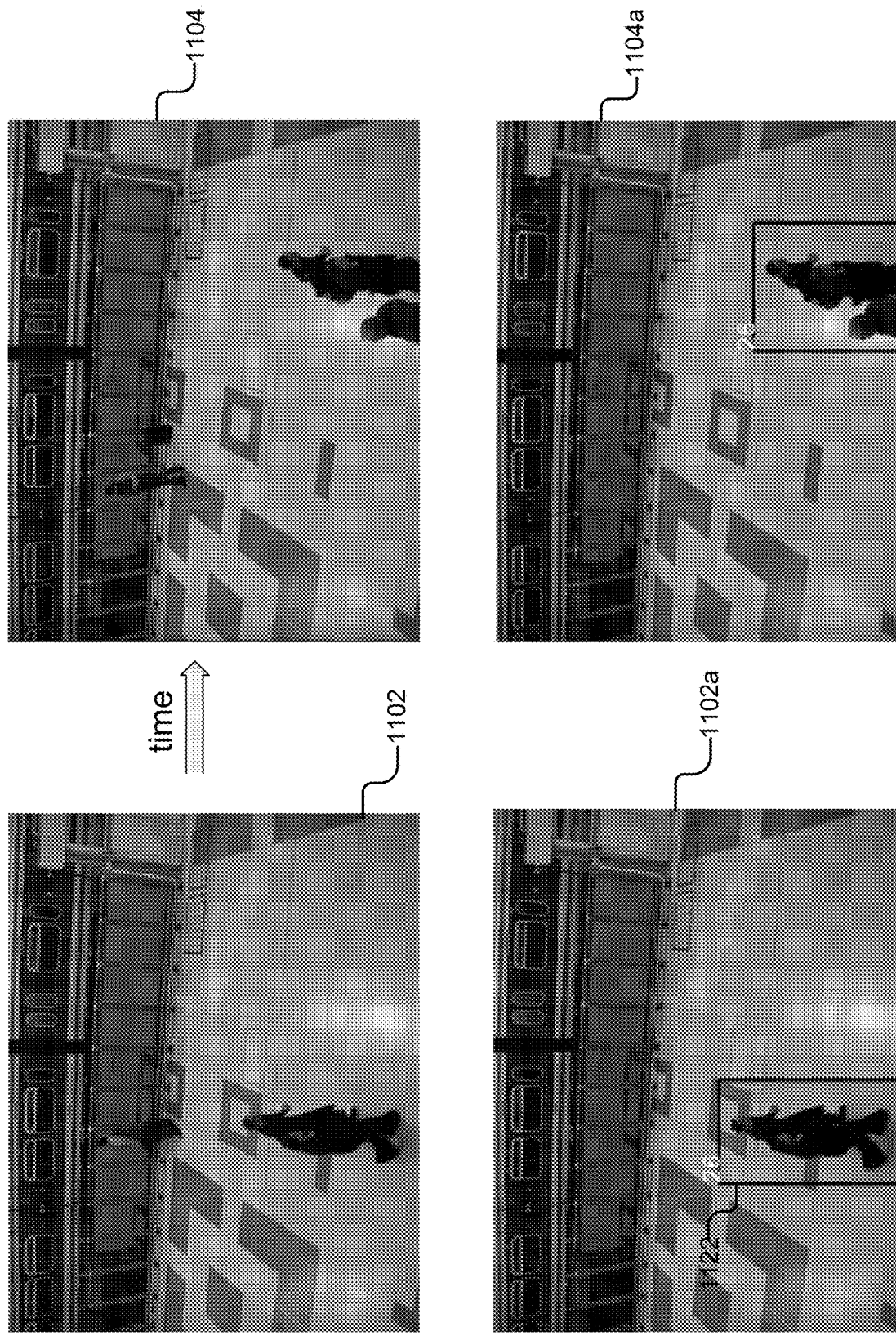
FIGS. 11A and 11B depict a graphical representation of a comparison between images of an original video and images of a video composition that is synthesized based on the original video.
Figure 11B:
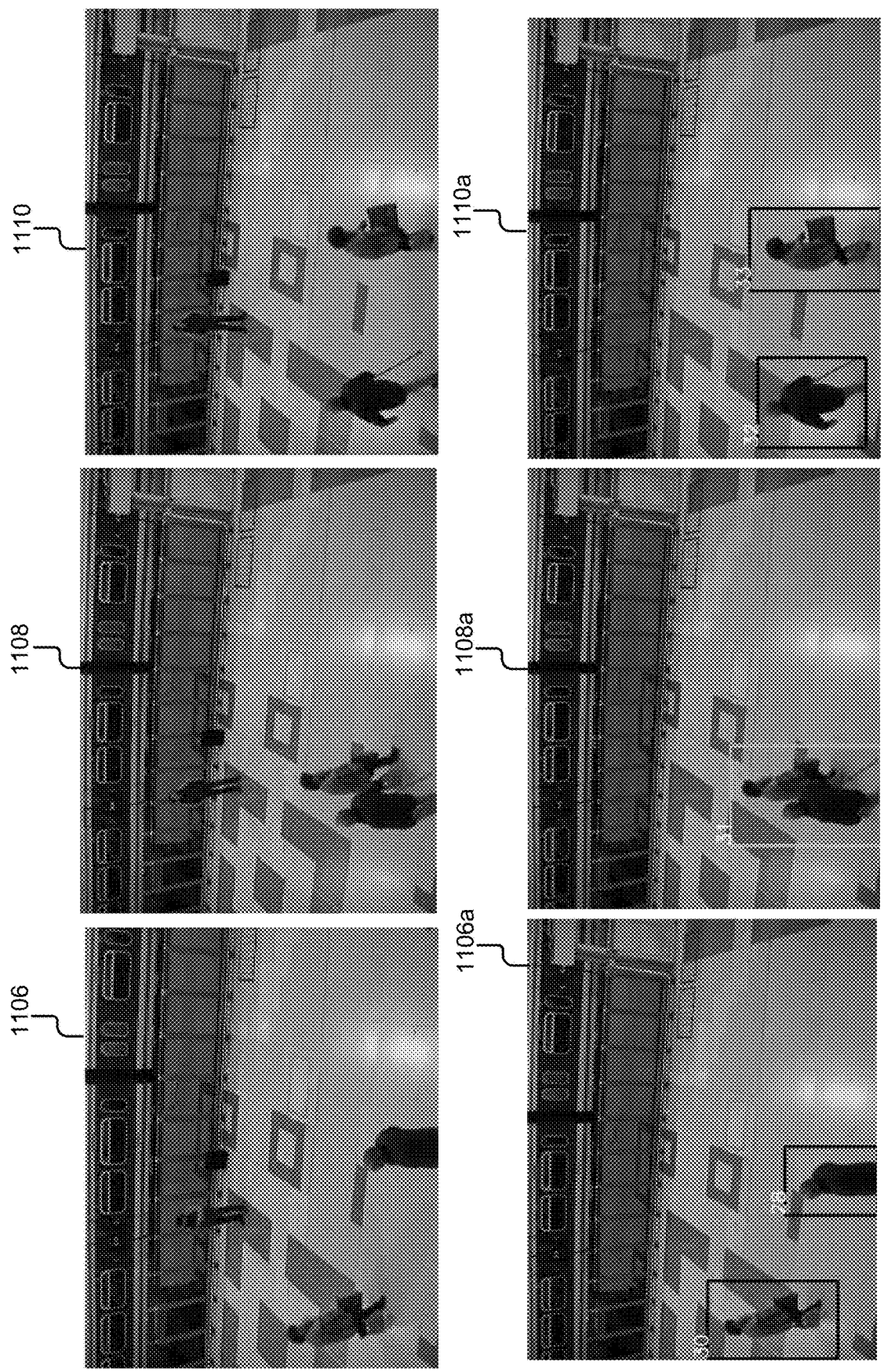

In some embodiments, the assembling module 223 may overlay the salient fragments on the non-salient portions of the video based on time-shift information, the weights associated with the salient fragments, the spatial-shift information to generate the video composition. The assembling module 223 may also communicate with the user interface engine 213 to provide the video composition to the user for playing, sharing, or storing. Images from an example video composition are depicted in FIGS. 11A and 11B as compared to images of the original video.

The assembling module 223 uses the time-shift information, the weights associated with the salient fragments, and the spatial-shift information to optimize the generation of the video composition, for example, by optimizing an objective function that determines the new start times of all fragments. In some embodiments, the assembling module 223 relies on the weight associated with each of the fragments to order the fragments such that fragments with zero weight are considered background and other fragments are layered on the video based on the increasing value of the weights. In other embodiments, the assembling module 223 also considers the fragments within a cluster together to be time-shifted and/or spatially-distorted within the permissible zone of activity to minimize collision with fragments in other clusters.

Since a plurality of salient fragments of a video are indexed and stored in a database, the assembling module 223, communicating with other components of the synthesis module 211 and other modules of the video decomposition application 103, can dynamically generate video compositions based on queries. For example, responsive to different queries of a first salient fragment of the video, the assembling module 223 may generate different video compositions because the salient fragments related to the first fragment and retrieved from the database are different. Even for a single query of the first salient fragment, the assembling module 223 may also generate different video compositions based on different sets of related salient fragments selected by the analysis module 205. For example, a video composition can be generated for every cluster retrieved in response to the query. By providing alternative video compositions, the current approach suits the user's need even if the user's intention of querying an image of the video is unclear.

It is particularly advantageous that the assembling module 223 can dynamically generate video compositions based on queries. There exist approaches that create a short video summary (e.g., a video synopsis) to summarize a scene over a time period of a long video. For example, these approaches may generate video synopses with different time lengths (e.g., a two-minute video synopsis, a 10-minute video synopsis) for a one-hour video and return a video synopsis with a certain length to a user upon a user query. However, such approaches may only build an index after generating the result instead of before generating the result as described in this disclosure, for example, these approaches index and store the query result (e.g., the video synopses) rather than portions of images that are used to generate the query result. Therefore, if a number of video synopses with different time lengths were generated, indexed, and stored in a database, and a user queries for a video synopsis with a certain length, these approaches will search the database based on the index and return the video synopsis with the certain length to the user. The existing approaches always provide the same video synopsis to the user based on the certain time length, which is not dynamic. In contrast, the approach described in this disclosure is more flexible, more efficient, and more fit to the user's need.

FIGS. 11A and 11B depict a graphical representation of a comparison between images of an original video and images of video composition that is synthesized based on the original video. As described above, responsive to a query of image 602 of fragment 31 shown in FIG. 6, the analysis module 205 determines a set of salient fragments that are related to fragment 31, and transmits the set of salient fragments to the synthesis module 211 to generate a video composition. The set of salient fragments selected by the analysis module 205 from all the salient fragments includes fragments 26, 28, 30, 31, 32, and 33 shown in FIGS. 7 and 8. The resulting video composition generated by the synthesis module 211 based on these salient fragments and non-salient portions of the video is illustrated in FIGS. 11A and 11B.

In FIGS. 11A and 11B, images 1102, 1104, 1106, 1108, and 1110 depicted in the upper part are taken from the original surveillance video, while images 1102a, 1104a, 1106a, 1108a, and 1110a depicted in the lower part are taken from the video composition synthesized based on the surveillance video. Each pair of images, for example, 1102 and 1102a, 1104 and 1104a, 1106 and 1106a, 1108 and 1108a, and 1110 and 1110a, is taken at a same time instant such that the difference between the original video and the video composition can be compared. Also, images 1102-1110 and 1102a-1110a are arranged in chronological order.

In FIG. 11A, the comparison of images 1102 and 1102a shows that the man standing in the back of the original video is removed from the video composition. The man is removed because he is in a position that is far from the two people of fragment 26 passing by. The analysis module 205 therefore excludes the salient fragment of the man from the set of salient fragments that is related to fragment 31. Without the salient fragment of the man, the video composition generated by the synthesis module 211 does not include the man. Similarly, in FIG. 11B, the man in images 1106, 1108, 1110 of the original video is no longer in images 1106a, 1108a, 1110a of the video composition. However, the lady holding bags of fragments 30, 31, and 33 and the gentleman with a stick of fragments 28, 31, and 32 in the original video are still included in the images of the video composition because the analysis module 205 determines that fragments 28, 30, 31, 32, and 33 including the lady and the gentleman are related based on a spatio-temporal overlap. As compared to the original video, the video composition ignores unrelated information about the man in the back, and includes only information about the lady and the gentleman that is interesting to the user. The use of the video composition therefore saves the user from time-consuming and tedious task of watching all components of the original surveillance video and/or being distracted by additional elements in the video, and improves efficiency and accuracy. One skilled in the art will recognize that the generation of the video composition in FIGS. 11A and 11B is only described in one method and in a particular order of method steps. There are other methods and/or other orders of implementing steps of a method for generating a video composition. Examples are described below with reference to FIGS. 13A-D.

Returning to FIG. 2B, the user interface engine 213 may include software and/or logic for providing user interfaces to a user, for example via display device 219. In some embodiments, the user interface engine 213 generate user interfaces that allow a user to receive a plurality of salient fragments of a video and to send a selection of a frame of one of the plurality of salient fragments that the user is interested in. In other embodiments, the user interface engine 213 receives instructions from the synthesis module 211, and sends graphical user interface data to the client device 115 via the communication unit 241 causing a video composition to be displayed on display device 219. In some other embodiments, the user interface engine 213 may communicate with the analysis module 205 to generate a user interface including a connectivity graph connecting a set of selected salient fragments of a video and transmit the user interface to the client device 115 for display to a user.

Figure 12:
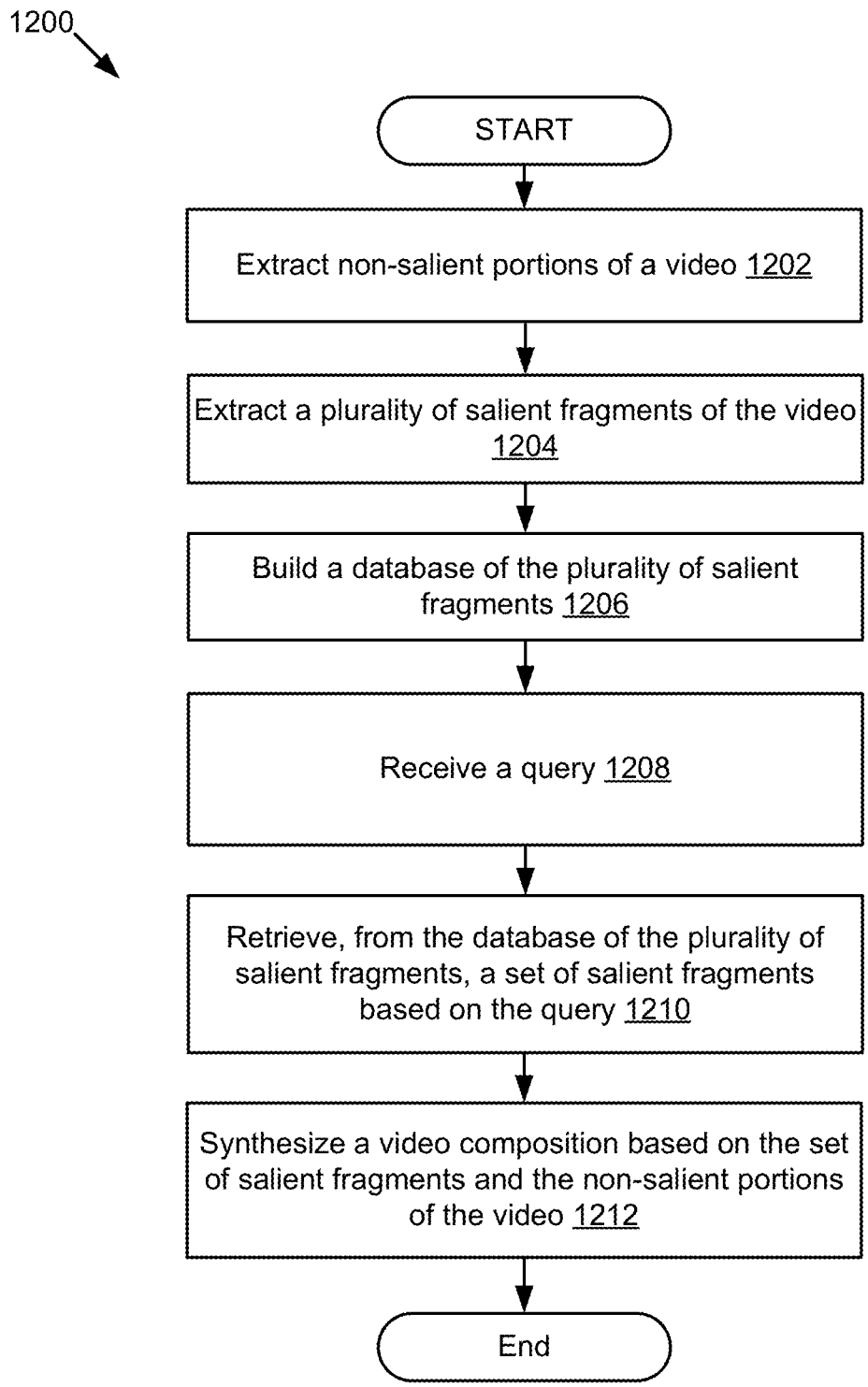
FIG. 12 depicts a flow diagram illustrating one embodiment of a method for decomposing a video stream into salient fragments and synthesizing a video composition based on the salient fragments.

FIG. 12 depicts a flow diagram illustrating one embodiment of a method 1200 for decomposing a video to salient fragments and synthesizing a video composition based on the salient fragments. As described above, the video decomposition application 103 may include a non-salience module 201, a salience module 203, an analysis module 205, an indexer 207, a query module 209, and a synthesis module 211. At 1202, the non-salience module 201 extracts non-salient portions of a video. At 1204, the salience module 203 extracts a plurality of salient fragments of the video. At 1206, the indexer 207 builds a database of the plurality of salient fragments. At 1208, the synthesis module 211 receives a query. At 1210, the synthesis module 211 communicates with the analysis module 205 and the query module 209 to retrieve, from the database of the plurality of salient fragments, a set of salient fragments based on the query. At 1212, the synthesis module 211 synthesizes a video composition based on the set of salient fragments and the non-salient portions of the video.

FIGS. 13A-13D depict flow diagrams illustrating embodiments of a method for decomposing a video to salient fragments that are used to synthesize a video composition. Each figure depicts a method variation implemented by a video decomposition application 103 including a non-salience module 201, a salience module 203, an analysis module 205, an indexer 207, a query module 209, and a synthesis module 211.

Figure 13A:
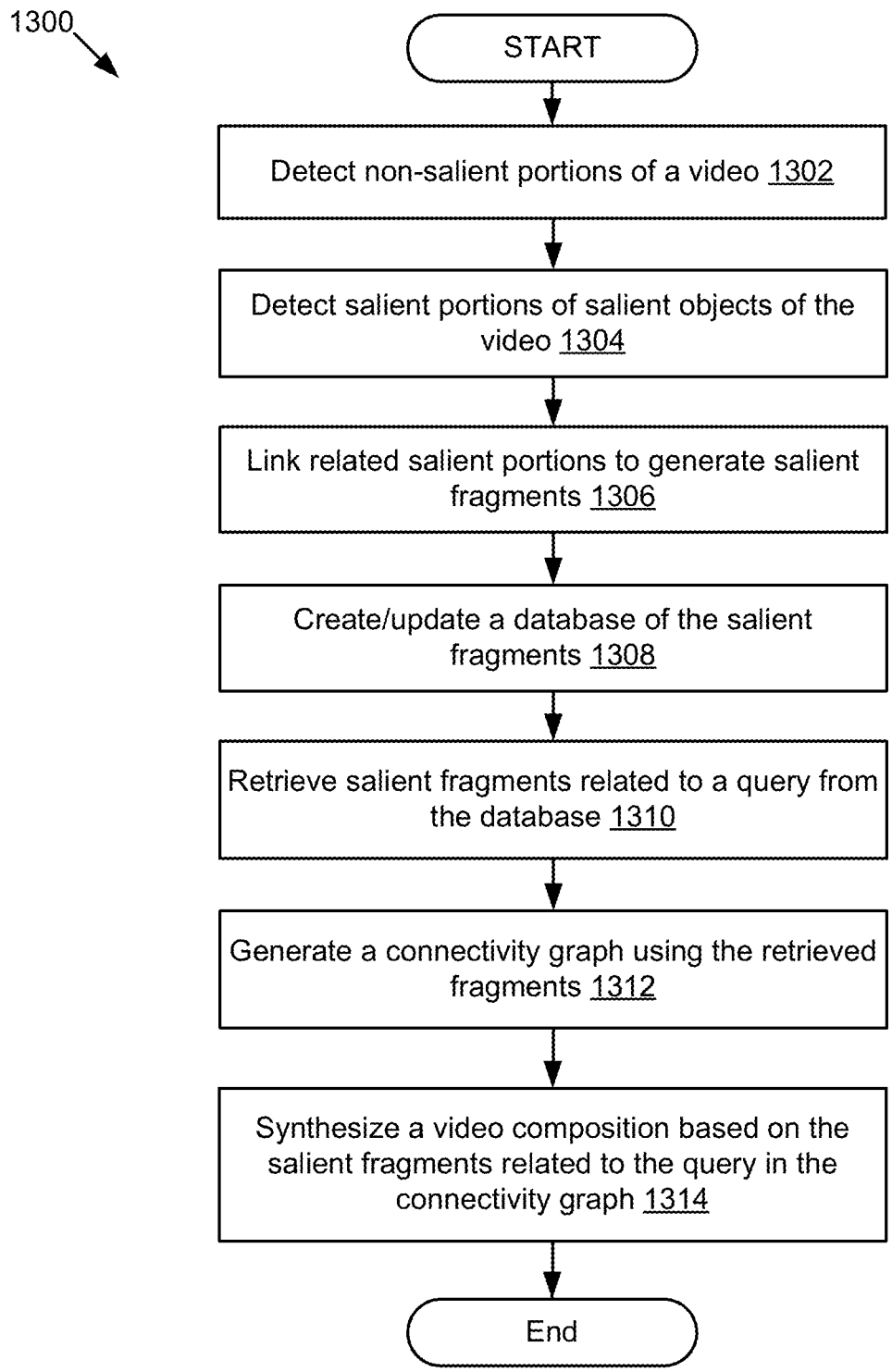
FIGS. 13A-13D depict flow diagrams illustrating embodiments of a method for decomposing a video stream into salient fragments that are used to synthesize a video composition.

FIG. 13A depicts a method 1300. At 1302, the non-salience module 201 detects non-salient portions of a video. At 1304, the salience module 203 detects salient portions of salient objects of the video. At 1306, the salience module 203 links related salient portions to generate salient fragments. At 1308, the indexer 207 creates/updates a database of the salient fragments. At 1310, the query module 209 retrieves salient fragments related to a query from the database. At 1312, the analysis module 205 generates a connectivity graph using the retrieved fragments. At 1314, the synthesis module 211 synthesizes a video composition based on the salient fragments related to the query in the connectivity graph.

Using the method 1300, the query module 209 retrieves the fragments related to the query based on overlapping time intervals of the query and all associated fragments from the database. The query module 209 may also identify fragments that are directly overlapping to the query, and retrieve the fragments that overlap with the identified fragments. Responsive to the retrieved fragments, the analysis module 205 generates the connectivity graph. The synthesis module 211 uses all the connected fragments in the graph and ignores the rest of the retrieved fragments to obtain the video composition.

Figure 13B:
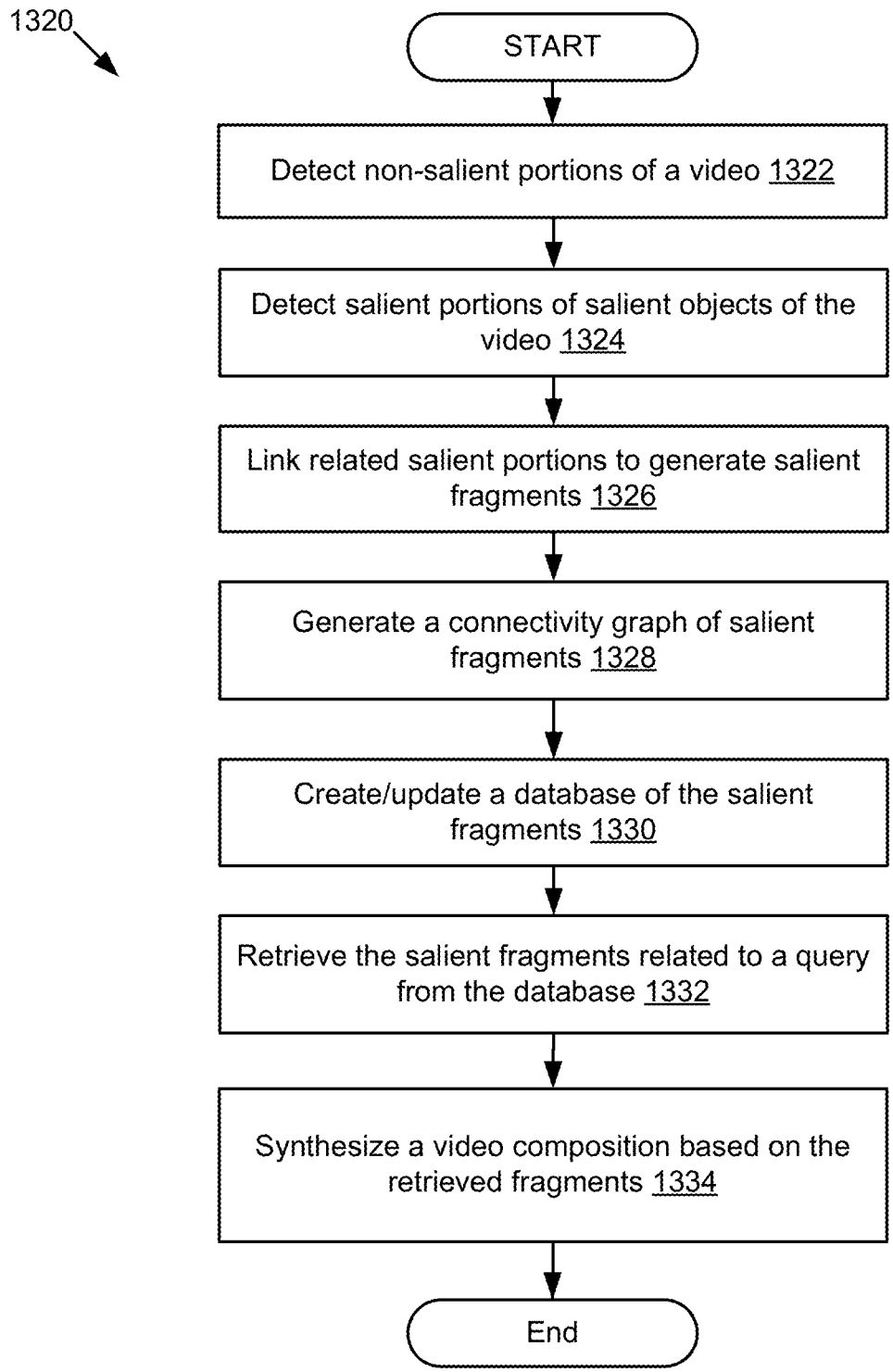

FIG. 13B depicts a method 1320. At 1322, the non-salience module 201 detects non-salient portions of a video. At 1324, the salience module 203 detects salient portions of salient objects of the video. At 1326, the salience module 203 links related salient portions to generate salient fragments. At 1328, the analysis module 205 generates a connectivity graph of salient fragments. At 1330, the indexer 207 creates/updates a database of the salient fragments. At 1332, the query module 209 communicates with the analysis module 205 to retrieve the salient fragments related to a query from the database. At 1334, the synthesis module 211 synthesizes a video composition based on the retrieved salient fragments.

Based on the method 1320, the analysis module 205 first generates the connectivity graph of salient fragments, and the indexer 207 updates the database based on graph connectivity information. Upon receiving the query (e.g., a salient fragment), the synthesis module 211 retrieves the fragments that are connected to the query fragment in the graph, and uses the retrieved fragments to generate the video composition.

Figure 13C:
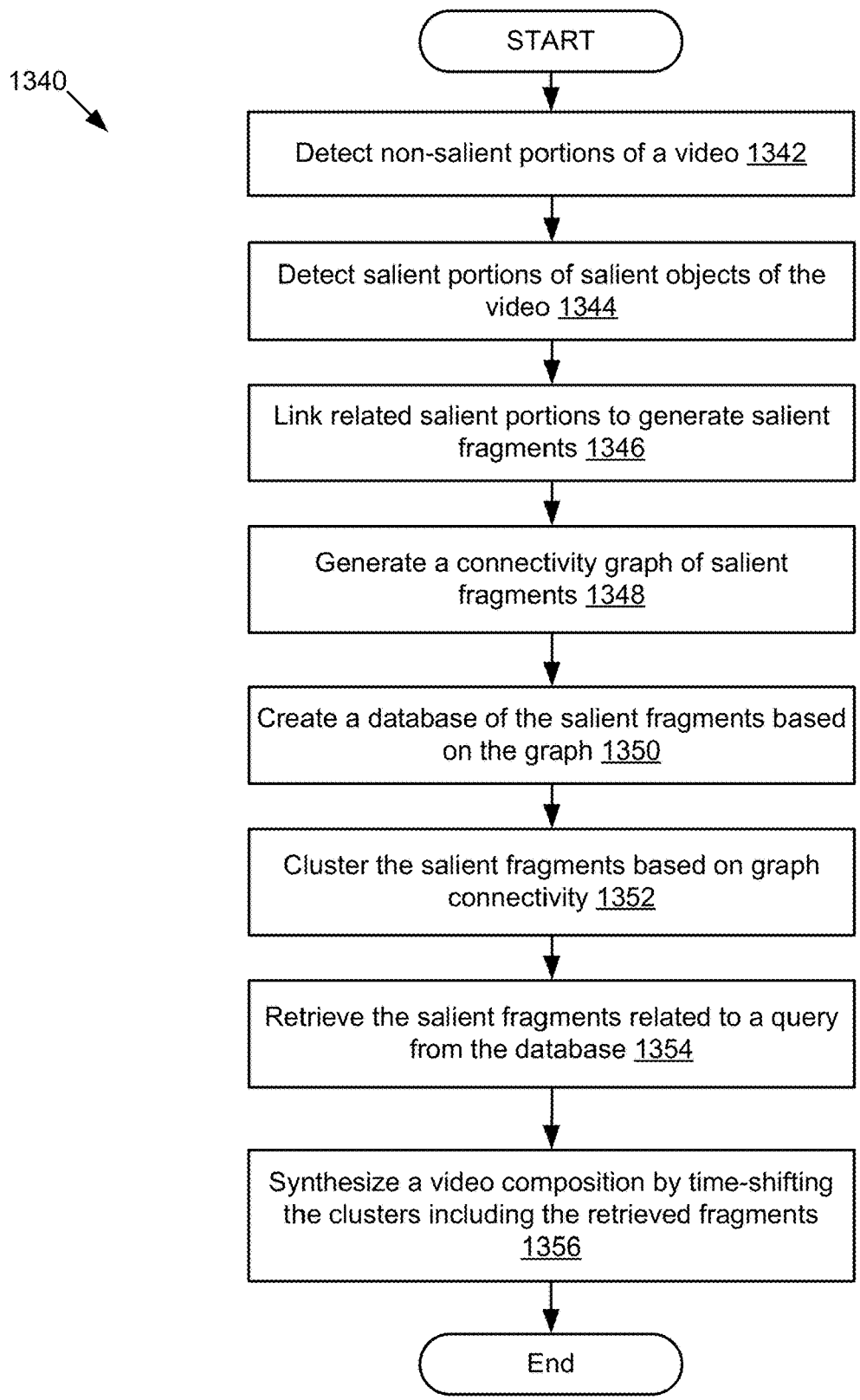

FIG. 13C depicts a method 1340. At 1342, the non-salience module 201 detects non-salient portions of a video. At 1344, the salience module 203 detects salient portions of salient objects of the video. At 1346, the salience module 203 links related salient portions to generate salient fragments. At 1348, the analysis module 205 generates a connectivity graph of salient fragments. At 1350, the indexer 207 creates/updates a database of the salient fragments based on the graph. At 1352, a clustering module 215 included in the analysis module 205 clusters the salient fragments based on graph connectivity. At 1354, the query module 209 communicates with the analysis module 205 to retrieve the salient fragments related to a query from the database. At 1356, the synthesis module 211 synthesizes a video composition by time-shifting the clusters including the retrieved salient fragments.

Based on the method 1340, the analysis module 205 first generates the connectivity graph of salient fragments. Upon receiving the query (e.g., a time interval), the query module 209 communicates with the analysis module 205 to retrieve the fragments within the given time interval along with the graph connectivity information. The analysis module 205 then reassembles a sub-graph for the retrieved graph and clusters. The synthesis module 211 uses this clustered set of fragments to generate the video composition.

Figure 13D:
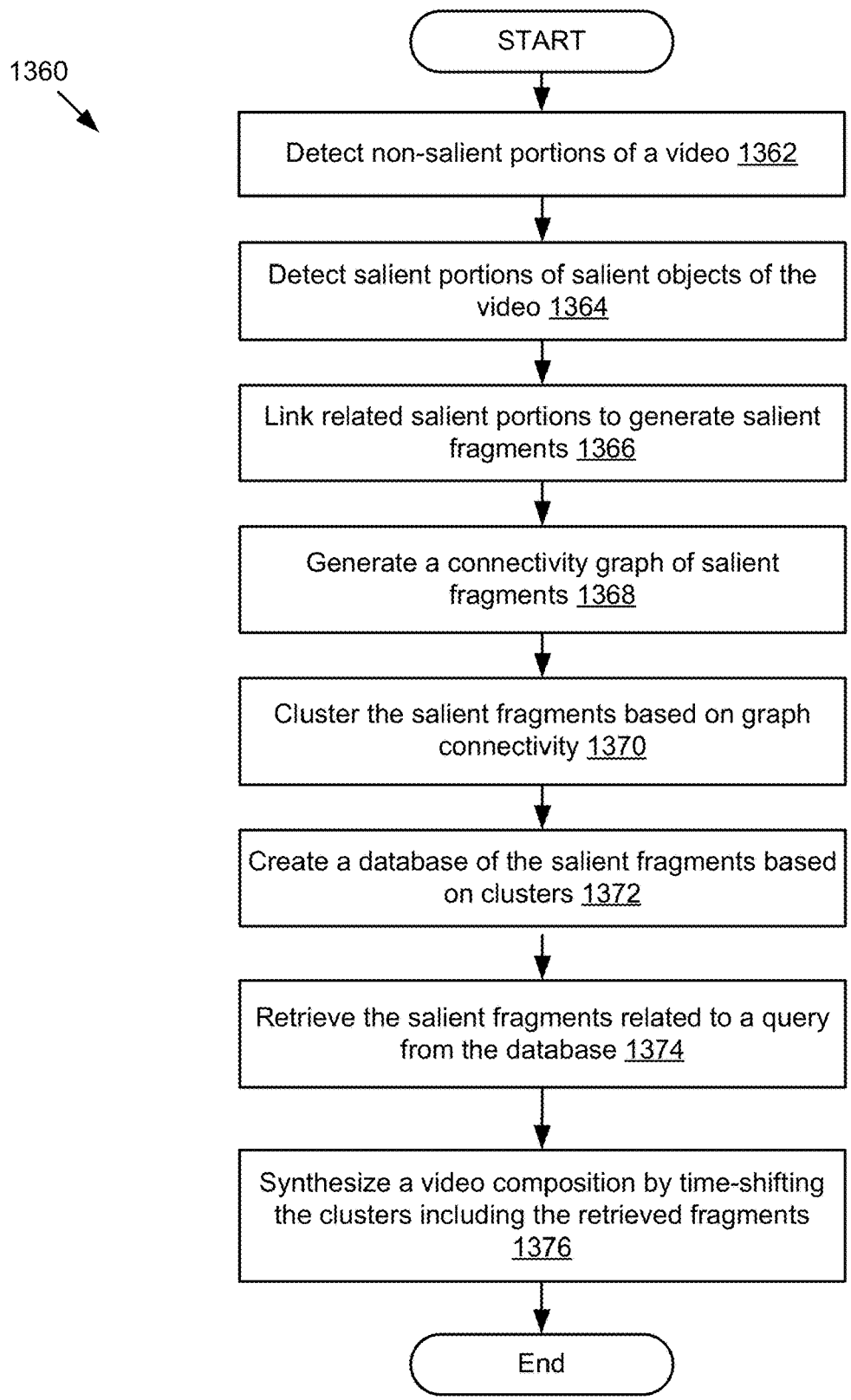

FIG. 13D depicts a method 1360. At 1362, the non-salience module 201 detects non-salient portions of a video. At 1364, the salience module 203 detects salient portions of salient objects of the video. At 1366, the salience module 203 links related salient portions to generate salient fragments. At 1368, the analysis module 205 generates a connectivity graph of salient fragments. At 1370, a clustering module 215 included in the analysis module 205 clusters the salient fragments based on graph connectivity. At 1372, the indexer 207 creates/updates a database of the salient fragments. At 1374, the query module 209 communicating with the analysis module 205 to retrieve the salient fragments related to a query from the database. At 1376, the synthesis module 211 synthesizes a video composition by time-shifting the clusters including the retrieved salient fragments.

Based on the method 1360, the analysis module 205 first generates the connectivity graph of salient fragments. The indexer 207 uses the graph connectivity and the clustering to update the database. Upon receiving the query (e.g., a time interval), the query module 209 communicates with the analysis module 205 to retrieve the fragments within the given time interval along with the graph connectivity information and clustering information. The synthesis module 211 then uses the retrieved fragments and the clustering information to generate the video composition.

Figure 14A:
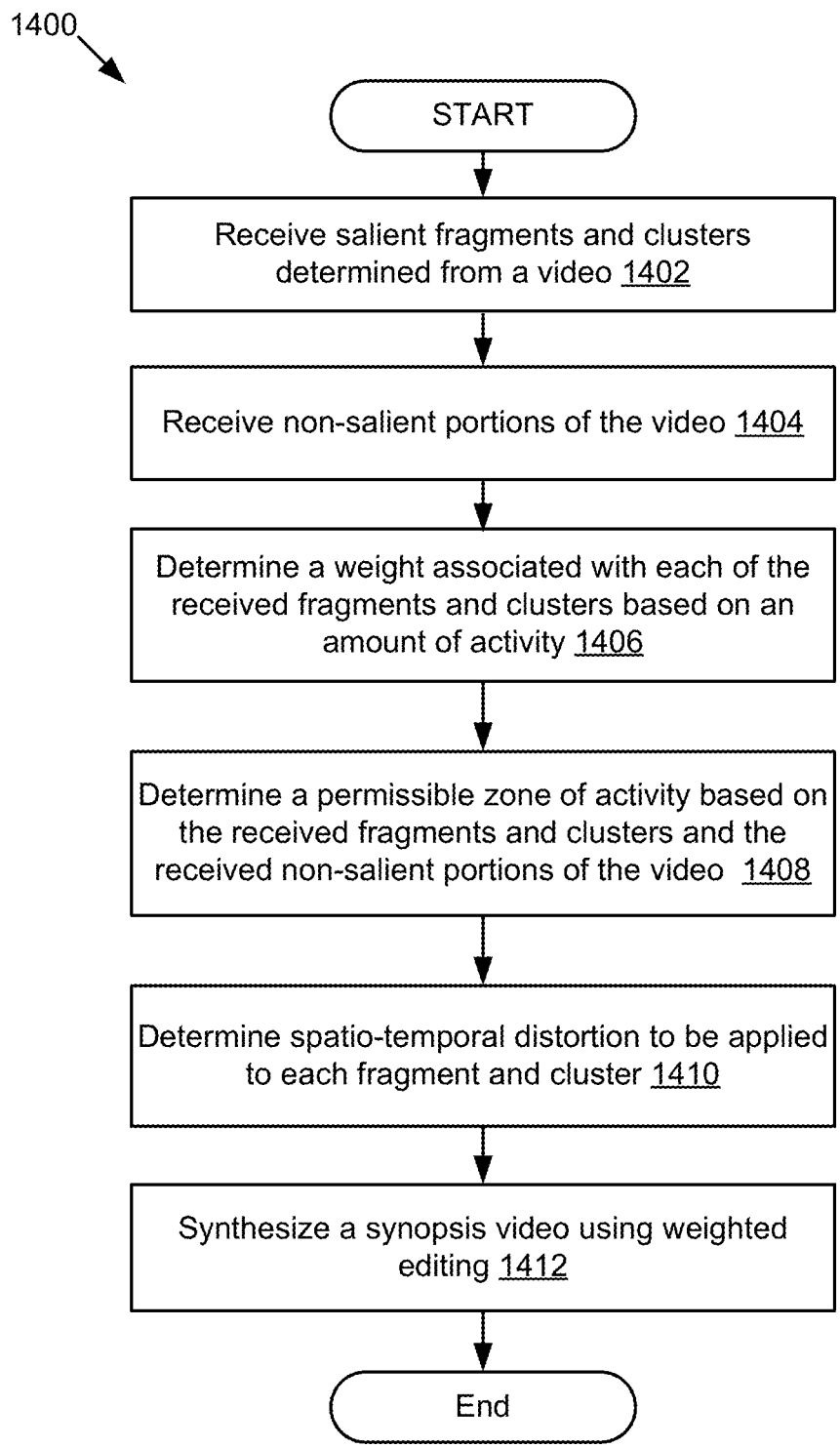
FIGS. 14A and 14B depict flow diagrams illustrating embodiments of a method for synthesizing a video composition.
Figure 14B:
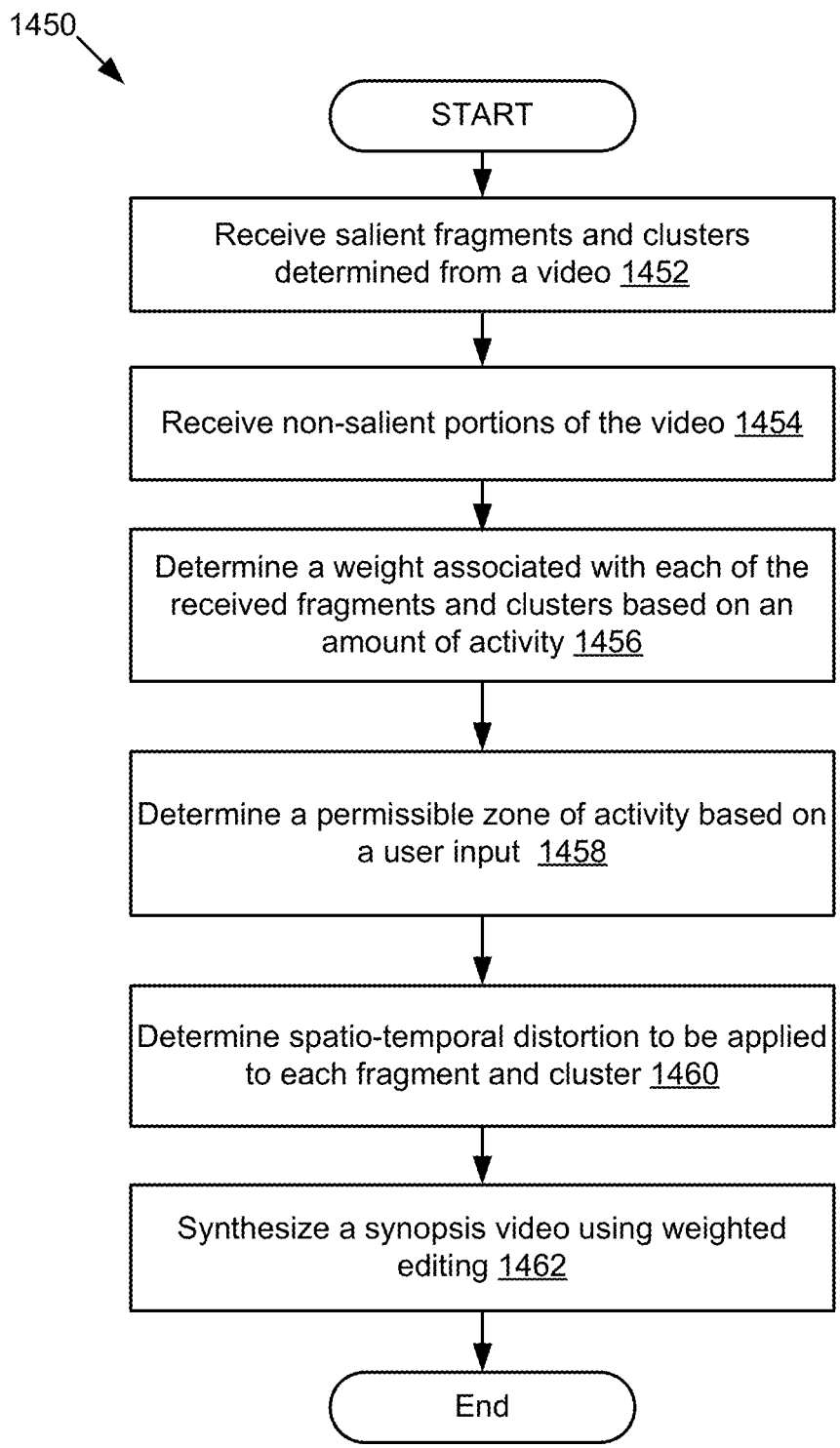

FIGS. 14A and 14B depict flow diagrams illustrating embodiments of a method for synthesizing a video composition. The method is implemented by a synthesis module 211 including a clustering module 215, a time-shift module 217, a weight-editing module 219, a distortion module 221, and an assembling module 223.

FIG. 14A depicts a method 1400. At 1402, the time-shift module 217, the weight-editing module 219, and the distortion module 221 receive salient fragments and clusters determined from a video. At 1404, the time-shift module 217, the weight-editing module 219, and the distortion module 221 receive non-salient portions of the video. At 1406, the weight-editing module 219 determines a weight associated with each of the received fragments and clusters based on an amount of activity. At 1408, the distortion module 221 determines a permissible zone of activity based on the received fragments and clusters, and the received non-salient portions of the video. At 1410, the time-shift module 217 as well as the distortion module 221 determine spatio-temporal distortion to be applied to each fragment and cluster. At 1412, the assembling module 223 communicates with the time-shift module 217, the weight-editing module 219, and the distortion module 221 to synthesize a synopsis video using weighted editing.

The method 1400 in FIG. 14A depicts one embodiment of how a video synopsis is created. The synthesis module 211 receives fragments/clusters and also the non-salient portion of the original video. Upon receiving this, the synthesis module 211 first determines weights of each of clusters and/or individual fragments, and uses the fragments and non-salient input to determine the permissible zone of activity. This input is then used by the synthesis module 211 to determine both the time and spatial shift each cluster or fragment undergoes. The synthesis module 211 determines the final synopsis using the weighting information.

FIG. 14B depicts a method 1450. At 1452, the time-shift module 217, the weight-editing module 219, and the distortion module 221 receive salient fragments and clusters determined from a video. At 1454, the time-shift module 217, the weight-editing module 219, and the distortion module 221 receive non-salient portions of the video. At 1456, the weight-editing module 219 determines a weight associated with each of the received fragments and clusters based on an amount of activity. At 1458, the distortion module 221 determines a permissible zone of activity based on a user input. At 1460, the time-shift module 217 as well as the distortion module 221 determine spatio-temporal distortion to be applied to each fragment and cluster. At 1462, the assembling module 223 communicates with the time-shift module 217, the weight-editing module 219, and the distortion module 221 to synthesize a synopsis video using weighted editing.

The method 1450 in FIG. 14B also depicts how a video synopsis is created. The synthesis module 211 receives the fragments and also the non-salient portions of the original video. Upon receiving this, the synthesis module 211 first determines weights of each of clusters and/or individual fragments. This input along with the permissible zone of activity given by the user is then used by the synthesis module 211 to determine both the time and spatial shift each cluster or fragment undergoes. The synthesis module 211 composes the final synopsis using the weighting information.

Figure 15A:
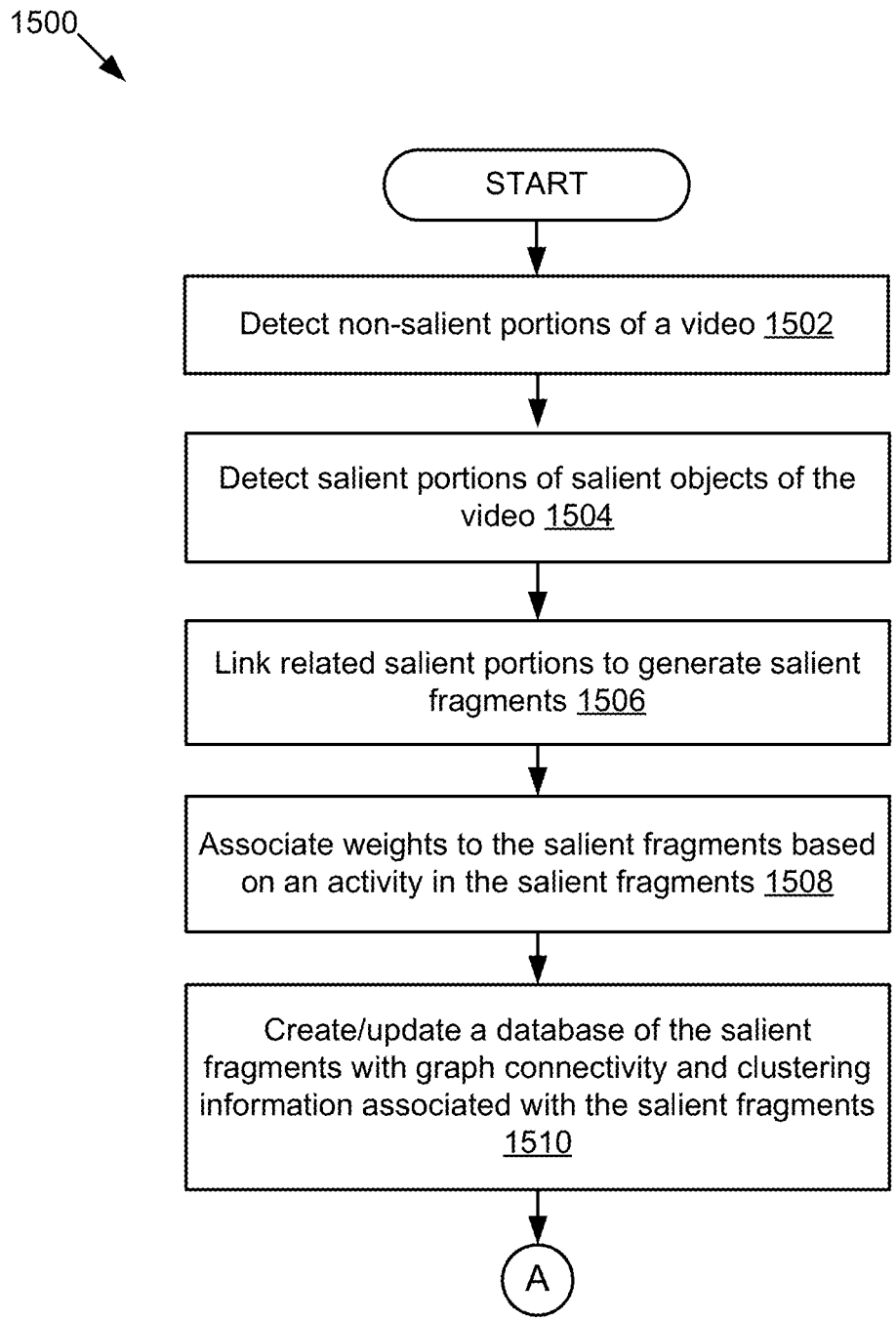
FIGS. 15A and 15B depict flow diagrams illustrating another embodiment of a method for decomposing a video stream into salient fragments and synthesizing a video composition based on the salient fragments.
Figure 15B:
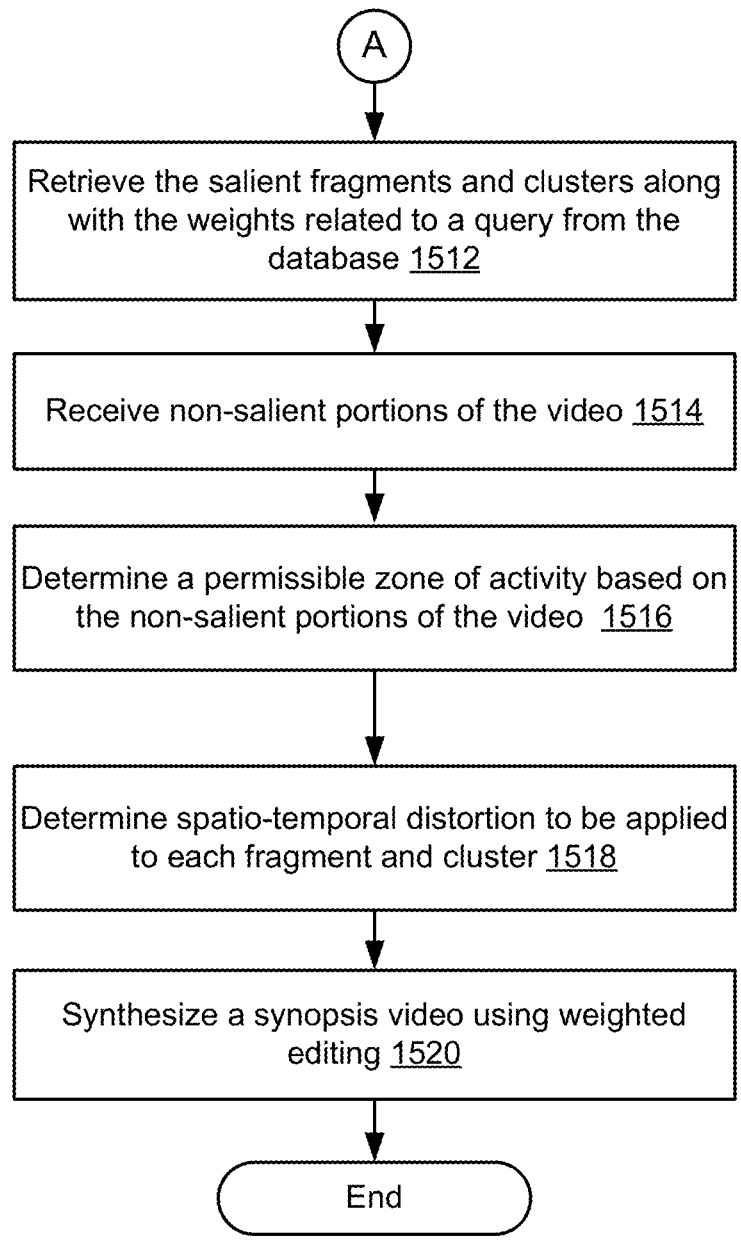

FIGS. 15A and 15B depict flow diagrams illustrating another embodiment of a method for decomposing a video to salient fragments and synthesizing a video composition based on the salient fragments. As described above, the video decomposition application 103 may include a non-salience module 201, a salience module 203, an analysis module 205, an indexer 207, a query module 209, and a synthesis module 211. The synthesis module 211 includes a clustering module 215, a time-shift module 217, a weight editing module 219, a distortion module 221, and an assembling module 223.

FIG. 15A depicts one embodiment of how to create a database of salient fragments of a video based on the decomposition of the video. At 1502, the non-salience module 201 detects non-salient portions of a video. At 1504, the salience module 203 detects salient portions of salient objects of the video. At 1506, the salience module 203 links related salient portions to generate salient fragments. At 1508, the weight editing module 219 associates weights to the salient fragments based on an activity in the salient fragments. At 1510, the indexer 207 creates/updates a database of the salient fragments with graph connectivity and clustering information associated with the salient fragments. In FIG. 15A, the weights for the fragments are determined before updating the database.

FIG. 15B depicts how to generate the synopsis video based on the information collected in FIG. 15A. At 1512, the time-shift module 217, the weight-editing module 219, and the distortion module 221 retrieve the salient fragments and clusters along with the weights related to a query from the database. At 1514, the time-shift module 217, the weight-editing module 219, and the distortion module 221 receive non-salient portions of the video. At 1516, the distortion module 221 determines a permissible zone of activity based on the non-salient portions of the video. At 1518, the time-shift module 217 as well as the distortion module 221 determine spatio-temporal distortion to be applied to each fragment and cluster. At 1520, the assembling module 223 communicates with the time-shift module 217, the weight-editing module 219, and the distortion module 221 to synthesize a synopsis video using weighted editing.

A system and method for decomposing a video to salient fragments and synthesizing a video composition based on the salient fragments has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   extracting a plurality of salient fragments of a video, each salient fragment including a subset of frames of the video and a subset of pixels from the subset of frames, wherein a salient fragment is extracted by:
     identifying a subset of time-related frames of the video that include salient portions as the subset of frames;
     identifying a subset of pixels that are associated with the salient portion in each frame of the subset of time-related frames of the video as the salient fragment; and
     storing the salient fragment, including the subset of pixels associated with the salient portion from the subset of time-related frames of the video in a database of the plurality of salient fragments;
   extracting non-salient portions of the video that are irrelevant to the plurality of salient fragments;
   receiving a query;
   retrieving, from the database of the plurality of salient fragments, a first set of salient fragments based on the query by determining a graph connecting the salient fragments based on a spatial-temporal overlap or causality relationship between the salient fragments, identifying a first salient fragment related to the query, and retrieving the salient fragments connected in the graph to the first salient fragment as the first set of salient fragments; and
   synthesizing a video composition including the first set of salient fragments and the non-salient portions of the video associated with the first set of salient fragments.

2. The computer-implemented method of claim 1, further comprising identifying the salient fragment based on at least one of motion detection, contrast, color, and semantic information.

3. The computer-implemented method of claim 1, wherein each salient fragment is a portion of the video for a single salient activity localized in time and space.

4. The computer-implemented method of claim 1, wherein the query includes at least one of: the first salient fragment of the plurality of salient fragments, the first salient fragment and a second salient fragment of the plurality of salient fragments, a time interval, or an attribute associated with salient fragments of the plurality of salient fragments.

5. The computer-implemented method of claim 1, further comprising retrieving a second set of salient fragments from the first set of salient fragments based on a second query.

6. The computer-implemented method of claim 1, further comprising building an index for the database of the plurality of salient fragments, wherein the index is used for fast retrieval of salient fragments within the database.

7. The computer-implemented method of claim 6, wherein the index is built from the graph connecting the first salient fragment and a second salient fragment.

8. The computer-implemented method of claim 1, wherein synthesizing the video composition further comprises determining one or more time shifts that minimizes the spatial-temporal overlap between objects in the salient fragment.

9. The computer-implemented method of claim 1, further comprising grouping the first set of salient fragments into clusters, wherein the clusters include salient fragments having the spatial-temporal or causal relationship.

10. The computer-implemented method of claim 9, wherein synthesizing the video composition further comprises generating a synopsis based on time-shifting the clusters.

11. The computer-implemented method of claim 1, further comprising assigning a weight to the salient fragment in the first set of salient fragments based on an activity level associated with the salient fragment.

12. The computer-implemented method of claim 11, wherein synthesizing the video composition further comprises assigning the salient fragment to an editing layer based on the weight corresponding to the salient fragment.

13. The computer-implemented method of claim 1, wherein synthesizing the video composition further comprises performing a spatial-temporal distortion on the first salient fragment of the first set of salient fragments to avoid a collision with a second salient fragment of the first set of salient fragments.

14. The computer-implemented method of claim 13, further comprising bounding the spatial-temporal distortion by a zone of permissible activity within the non-salient portions of the video.

15. A system comprising:
one or more processors; and
a memory, the memory storing instructions, which when executed by the one or more processors cause the one or more processors to:
extract a plurality of salient fragments of a video, each salient fragment including a subset of frames of the video and a subset of pixels from the subset of frames, wherein a salient fragment is extracted by:
identifying a subset of time-related frames of the video that include salient portions as the subset of frames;
identifying a subset of pixels that are associated with the salient portion in each frame of the subset of time-related frames of the video as the salient fragment; and
storing the salient fragment, including the subset of pixels associated with the salient portion from the subset of time-related frames of the video in a database of the plurality of salient fragments;
extract non-salient portions of the video that are irrelevant to the plurality of salient fragments;
receive a query;
retrieve, from the database of the plurality of salient fragments, a first set of salient fragments based on the query by determining a graph connecting the salient fragments based on a spatial-temporal overlap or causality relationship between the salient fragments, identifying a first salient fragment related to the query, and retrieving the salient fragments connected in the graph to the first salient fragment as the first set of salient fragments; and
synthesize a video composition including the first set of salient fragments and the non-salient portions of the video associated with the first set of salient fragments.

16. The system of claim 15, wherein the instructions cause the one or more processors to identify the salient fragment based on at least one of motion detection, contrast, color, and semantic information.

17. The system of claim 15, wherein the query includes at least one of: the first salient fragment of the plurality of salient fragments, the first salient fragment and a second salient fragment of the plurality of salient fragments, a time interval, or an attribute associated with salient fragments of the plurality of salient fragments.

18. The system of claim 15, wherein the instructions further cause the one or more processors to build an index for the database of the plurality of salient fragments, wherein the index is used for fast retrieval of salient fragments within the database.

19. The system of claim 18, wherein the index is built from the graph connecting the first salient fragment and a second salient fragment.

20. A computer program product comprising a non-transitory computer readable medium storing a computer readable program, wherein the computer readable program when executed causes a computer to:
extract a plurality of salient fragments of a video, each salient fragment including a subset of frames of the video and a subset of pixels from the subset of frames, wherein a salient fragment is extracted by:
identifying a subset of time-related frames of the video that include salient portions as the subset of frames;
identifying a subset of pixels that are associated with the salient portion in each frame of the subset of time-related frames of the video as the salient fragment; and
storing the salient fragment, including the subset of pixels associated with the salient portion from the subset of time-related frames of the video in a database of the plurality of salient fragments;
extract non-salient portions of the video that are irrelevant to the plurality of salient fragments;
receive a query;
retrieve, from the database of the plurality of salient fragments, a first set of salient fragments based on the query by determining a graph connecting the salient fragments based on a spatial-temporal overlap or causality relationship between the salient fragments, identifying a first salient fragment related to the query, and retrieving the salient fragments connected in the graph to the first salient fragment as the first set of salient fragments; and synthesize a video composition including the first set of salient fragments and the non-salient portions of the video associated with the first set of salient fragments.

\* \* \* \* \*